United States Patent
Kamani et al.

(10) Patent No.: US 7,725,454 B2
(45) Date of Patent: May 25, 2010

(54) INDEXING AND SEARCHING OF INFORMATION INCLUDING HANDLER CHAINING

(75) Inventors: Prashant Kamani, Issaquah, WA (US); Daniel D. Fisher, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 322 days.

(21) Appl. No.: 11/880,281

(22) Filed: Jul. 20, 2007

(65) Prior Publication Data

US 2009/0024587 A1    Jan. 22, 2009

(51) Int. Cl.
*G06F 17/30* (2006.01)

(52) U.S. Cl. ........................... 707/711; 707/715

(58) Field of Classification Search .............. 707/3, 707/201
See application file for complete search history.

(56) References Cited

U.S. PATENT DOCUMENTS

| | | |
|---|---|---|
| 5,493,677 A | 2/1996 | Balogh et al. |
| 6,055,543 A | 4/2000 | Christensen et al. |
| 6,327,589 B1 | 12/2001 | Blewett et al. |
| 6,374,260 B1 | 4/2002 | Hoffert et al. |
| 6,785,688 B2 | 8/2004 | Abajian et al. |
| 6,925,475 B2 | 8/2005 | Essafi et al. |
| 6,959,326 B1 | 10/2005 | Day et al. |
| 7,010,144 B1 | 3/2006 | Davis et al. |
| 7,010,751 B2 | 3/2006 | Shneiderman |
| 7,028,253 B1 | 4/2006 | Lieberman et al. |
| 7,051,019 B1 | 5/2006 | Land et al. |
| 7,613,993 B1 | 11/2009 | Baer et al. ............... 715/205 |
| 2004/0161150 A1 | 8/2004 | Cukierman et al. |
| 2005/0289111 A1 | 12/2005 | Tribble et al. |
| 2006/0061595 A1 | 3/2006 | Goede et al. |
| 2006/0130117 A1* | 6/2006 | Lee et al. ............... 725/135 |
| 2006/0149781 A1 | 7/2006 | Blankinship |
| 2006/0200446 A1 | 9/2006 | Gursky et al. |
| 2006/0242118 A1 | 10/2006 | Engel |
| 2006/0242166 A1 | 10/2006 | Larcheveque et al. |
| 2006/0259516 A1 | 11/2006 | Stakutis et al. |
| 2007/0016546 A1 | 1/2007 | De Vorchik et al. |
| 2007/0038665 A1 | 2/2007 | Kwak et al. |
| 2007/0266007 A1* | 11/2007 | Arrouye et al. ............... 707/3 |
| 2008/0018503 A1* | 1/2008 | Kim et al. ............... 341/50 |

(Continued)

OTHER PUBLICATIONS

Lv et al., "Ferret: a toolkit for content-based similarity search of feature-rich data", Proceedings of the 1st ACM SIGOPS/EuroSys European Conference on Computer Systems, p. 317-330, Apr. 18, 2006. Retrieved from the Internet:<URL: http://portal.acm.org/ft_gateway.cfm?id=1217966&type=pdf&coll=ACM&dl=ACM&CFID=68510919&CFTOKEN=27950676>.*

(Continued)

*Primary Examiner*—Jean B. Fleurantin
*Assistant Examiner*—Dennis Myint
(74) *Attorney, Agent, or Firm*—Merchant & Gould

(57) ABSTRACT

Embodiments are provided to manage information associated with a number of disparate information sources. In an embodiment, a system includes a data structure having a uniform metadata representation and a metadata handler for interacting with the data structure. The data structure can be associated with an underlying file or some other type of information source. In one embodiment, a number of handlers can be chained together to extract and return information according to a desired mode of operation. The embodiments provide extensibility and can be tailored according to a desired implementation. Other embodiments and implementations are available.

20 Claims, 7 Drawing Sheets

U.S. PATENT DOCUMENTS

2008/0059495 A1    3/2008   Kiessig et al. .............. 707/100

OTHER PUBLICATIONS

Ozsoyoglu et al., "Querying web metadata: Native score management and text support in databases", ACM Transactions on Database Systems (TODS), vol. 29, Issue 4 (Dec. 2004), p. 581-634. Retrieved from the Internet:<URL:http://portal.acm.org/ft_gateway.cfm?id=1042047&type=pdf>.*

"Metadata Image Retrieval: Combining Content-Based and Metadata-Based Approaches," Date: Mar. 9, 2007; pp. 1-5; http://www.ariadne.ac.uk/issue19/metadata/.

Wikipedia (Free Encyclopedia)—"Content-Based Image Retrieval," Date: Mar. 9, 2007; pp. 1-6; http://en.wikipedia.org/wiki/Content-based_image_retrieval.

Yee et al., "Faceted Metadata for Image Search and Browsing," Date: Unknown; pp. 1-8; http://flamenco.berkeley.edu/papers/flamenco-chi03.pdf.

Cultivate Interactive—"ARTISTE Image Retrieval System Puts European Galleries in the Picture," Date: Mar. 9, 2007; pp. 1-28; http://www.cultivate-int.org/issue7/artiste/.

U.S. Appl. No. 11/880,331, filed Jul. 20, 2007, entitled "Heterogeneous Content Indexingand Searching".

"MindManajer IFilter; Product Description", printed on Nov. 19, 2007, pp. 1-2; http://www.ifiltershop.com/mindmanager-ifilter.html.

Kawtrakul. et al., "A Unified Framework for Automatic Metadata Extraction from Electronic Document", pp. 1-8; http://iadlc.nul.nagoya-u.ac.ip/archives/IADLC2005/kawrtrakul.pdf.

Dumais, et al., "Stuff I've Seen:A System for Personal Information Retrieval and Re-Use", pp. 1-8, Jul. 28-Aug. 1, 2003, SIGIR'03; http://research.microsoft.com/~sdumais/SISCore-SIGIR2003-Final.pdf.

* cited by examiner

INDEXING AND SEARCHING OF INFORMATION INCLUDING HANDLER CHAINING

RELATED APPLICATIONS

This application is related to U.S. patent application Ser. No. 11,880,331, filed Jul. 20, 2007, and entitled, "HETEROGENEOUS CONTENT INDEXING AND SEARCHING," which is hereby incorporated by reference in its entirety.

COPYRIGHT NOTICE

A portion of the disclosure of this patent document contains material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

Computer users have different ways to locate files and other information that may be locally or remotely stored. For example, some operating systems include built-in search wizards that can be used to locate files using keywords and other user input. However, some existing built-in search wizards can be slow and time consuming when performing searches, which can ultimately result in an unsatisfactory user experience. A user may have to abort a search before obtaining any relevant search results adding further inefficiency and dissatisfaction.

Some searching applications use indexing methods to index certain files, using the indexed information when responding to search requests. Indexing is used in efforts to quickly and efficiently return search results. However, many of the current applications are not properly configured to handle cases in which new file types and formats are being created and added to a system. In some cases, a new add-on can be created and introduced to the system to operate with a certain file format. Unfortunately, the creation process can require a large amount of time and learning, and often needs to be repeated for each new file type or format being introduced to a computing environment.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to manage information associated with a number of disparate information sources. In an embodiment, an extensible system is configured to use metadata and other information as part of an indexing operation. The system includes a handler that is configured to extract, filter, or otherwise assess metadata and other information that can be associated with a number of disparate information sources. In one embodiment, a number of handlers can be chained together to extract and return information according to a desired mode of operation.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments are provided to manage information associated with a number of disparate information sources. In an embodiment, an extensible system includes a handler configured to communicate metadata and other information as part of an indexing operation. The handler can operate to extract, filter, or otherwise assess metadata and other information associated with an information source which can be defined to include a uniform representation of metadata, but is not so limited.

In an embodiment, a system includes a metadata handler configured to extract metadata and free-form text from a data structure. The data structure can be configured to provide a uniform representation of metadata. The metadata and free-form text can be associated with underlying files or other information sources that can include varying formats, properties, and/or parameters. In one embodiment, a system includes a metadata handler that is configured to invoke a second handler as part of an indexing operation. The second handler can be associated with an underlying information source. The second handler can be used to extract metadata from the underlying information source and return the extracted metadata to the metadata handler. Thereafter, the metadata handler can return extracted metadata and/or free-form text based in part on a mode of operation setting.

Figure 1:
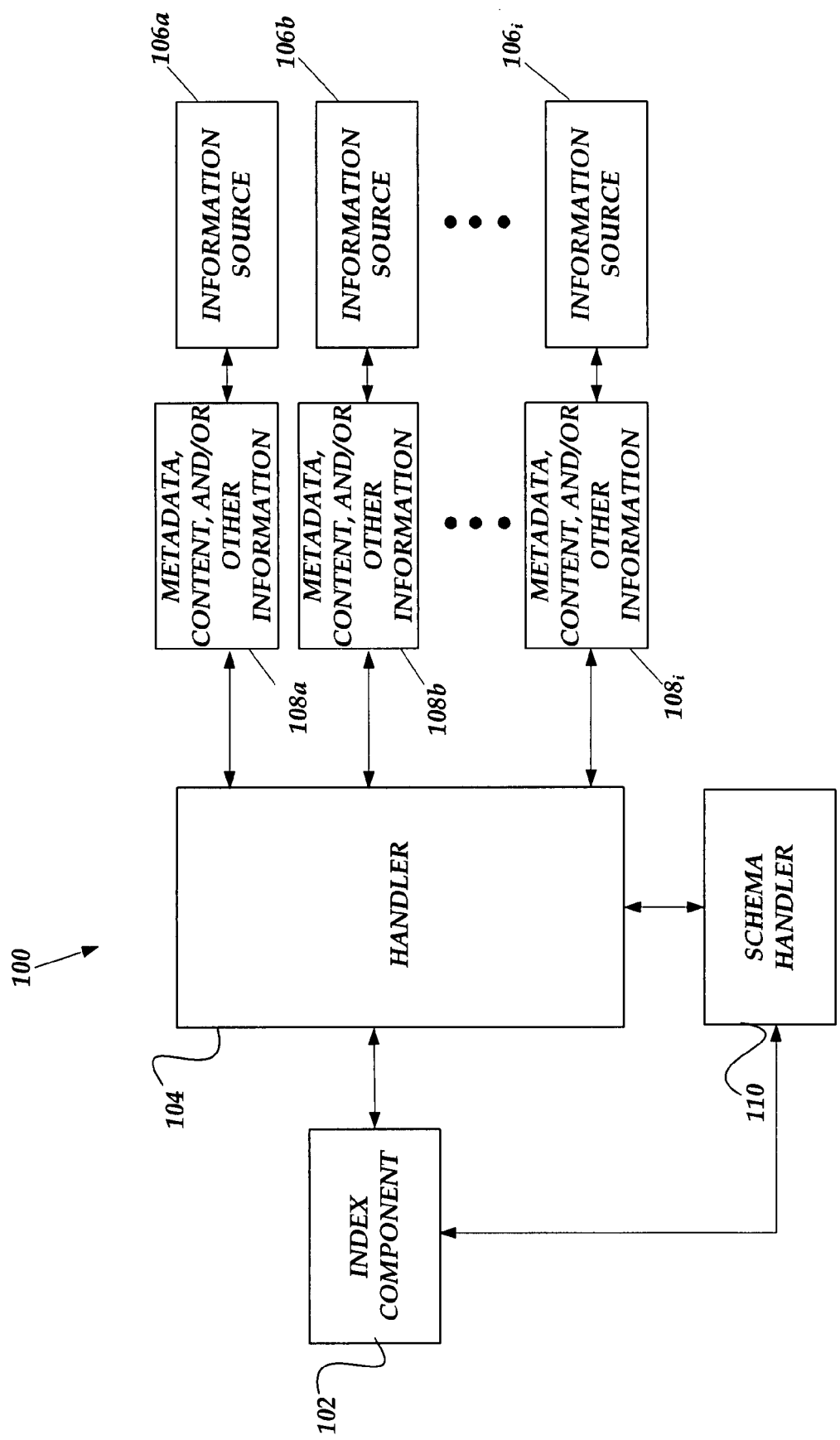
FIG. 1 depicts a block diagram of a system configured to manage information.

FIG. 1 is a block diagram of a system 100 configured to manage information, under an embodiment. As described below, the system 100 includes indexing and searching functionality which includes the use of metadata and other information that is associated with a number of disparate information sources. For example, the system 100 can be used to manage a number of files, file locations, and other information. In one embodiment, the system 100 can be configured to monitor a number of file locations, such as areas of a hard disk for example, and index information associated with the file locations, including metadata and/or other content of the files associated therewith. For example, the system 100 can be configured as a search engine which can operate to index information associated with file locations, files, and other data.

As shown in FIG. 1, the system 100 includes an index component 102 that is configured to use metadata, content, and other information to provide an efficient indexing of information that may be associated with files, file content, virtual content, etc. In one embodiment, the index component 102 can be configured to provide indexing features as part of a search engine's functionality based in part on various intrinsic properties, such as file name, file path, metadata (e.g., creation date, modified date, author, etc.), and/or various extrinsic properties, such as comments and textual content of a file for example.

The index component 102 can use extracted information associated with a number of files or other informational sources to construct an indexed catalog to facilitate efficient and rapid searching. For example, the index component 102 can use text, property information, and metadata extracted from locally stored files and/or remotely networked files when indexing. In one embodiment, the index component 102 is configured to interact with a file system, virtual web, network, or other informational source when indexing according to a desired implementation.

In an embodiment, the index component 102 is configured to monitor certain folders, files, memory locations, or other information sources. Once a file, application, or other informational or data construct has been modified or created, the index component 102 can operate to ascertain identification information associated with the modified or created file, application, or other informational or data construct. For example, if a new file is shown to exist as part of the monitoring process, the index component 102 can operate to determine the new file's extension. According to one embodiment, if the extension is associated with a particular file (e.g., a metadata definition document (MDD) file), the index component 102 looks at its registry and uses a handler 104 (described below) to interact with the particular file.

Accordingly, the handler 104 can be registered with the system 100 for a particular file, such an MDD file for example, or for a number of files or other information sources. For example, a metadata IFilter can be registered with a desktop search engine for a particular file format. As described further below, an MDD file can be created based on an underlying or primary information source, such as a document file, image file, video, file, audio file, virtual information source, etc. That is, the MDD file can store information, including metadata, associated with an underlying information source. In one embodiment, an MDD file is configured to provide a uniform representation of metadata and/or full-text search (FTS) data for any type of file format, including non-file formats.

With continuing reference to FIG. 1, and as described briefly above, the system 100 includes a handler 104. The handler 104 can be configured to interact with any type of metadata and is not limited to handling pre-defined types of metadata. In one embodiment, the handler 104 operates to interact with a file having an extensible markup language (XML) file format which identifies metadata using name-value pairs. Correspondingly, the handler 104 can use the name-value pair metadata descriptors as part of an indexing process. The handler 104 can be configured to extract metadata, content, properties, and/or other information associated with a number of file-based, non-file-based, or other information sources $106a$-$106_i$ (where "i" is an integer).

The handler 104 is configured with filtering functionality and can operate to filter information associated with an information source. For example, the handler 104 can operate to extract metadata from a file or a secondary data stream (e.g., NTFS stream) associated with a file or other data source. In one embodiment, the handler 104 is configured as a metadata IFilter including the associated interface to extract information from a uniform data structure that includes metadata that is associated with an underlying information source $106a$-$106_i$. The information sources $106a$-$106_i$ can also include new files with new file formats and/or pre-existing files having known file formats.

The handler 104 can be configured to locate, assess, and extract metadata, content, and/or other information (depicted as blocks $108a$-$108_i$ in FIG. 1) associated with the number of files $106a$-$106_i$. In one embodiment, the metadata, content, and/or other information (depicted as blocks $108a$-$108_i$) can be associated with a number of secondary files, referred to as MDD files herein. In an alternative embodiment, all, or select portions, of the extracted metadata, content, and/or other information (depicted as blocks $108a$-$108_i$) can be stored in a single container, file, or other data storage.

In one embodiment, the handler 104 can be included as part of the functionality of an assistance application, such as an indexing and searching system. For example, the handler 104 can be used when indexing information stored in a data storage medium, and the indexed information can then be used as part of rich searching operations. The handler 104 can be used to assess metadata associated with file content, non-file based content, virtual content, and other types of information.

For example, metadata may be added or associated with information, irrespective of the content-type. In one embodiment, the handler 104 can be included as part of the functionality of an assistance application, such as a desktop search engine for example, and can be used to examine a number of information sources, including a number of secondary data streams associated with a number of content-based files. The handler 104 can be configured to access the secondary stream and extract any associated metadata for use in indexing and searching operations. Multiple metadata streams can be used to describe different application and other associations.

As shown in FIG. 1, the system also includes a schema handler 110 in communication with the handler 104 and the index component 102. The schema handler 110 includes mapping functionality to provide a mapping interface between the handler 104 and index component 102, but is not so limited. In an alternative embodiment, the schema handler 110 can be included as part of the functionality of the handler 104. In another alternative embodiment, the schema handler 110 can be included as part of the functionality of the index component 102. In one embodiment, the schema handler 110 can be configured to map generic metadata to a metadata field that is understood by the index component 102 and/or associated search engine. Accordingly, the schema handler 110 can operate to map from a first metadata schema to a database metadata schema, generic metadata schema, application-specific metadata schema, or some other schema implementation.

For example, the schema handler 110 may be used with a pre-existing database where it may be cumbersome and inefficient to alter the database schema. As another example, an application may need changing or tweaking over time for various reasons and, as a result, a different schema may need to be introduced. As further example, the schema handler 110 can be used in situations where an application might use different "friendly" or language-specific names for metadata that it exposes to a user. A data-driven schema provides flexibility to change the schema and/or the mapping without changing code, thereby providing an extensible application. For example, name-value pairs can be used to define new metadata for different purposes, thereby providing extensible features to the system 100.

As described above, the index component 102 can use the handler 104 to extract and/or return metadata, content, and/or other information for use by the index component 102 and/or other components. The handler 104 can operate with a unified representation of metadata, as described below. For example, the handler 104 can be configured to interact with one or more files having a particular file format that include metadata and associated parameters that are not constrained by the underlying content. The handler 104 can operate to track and return any metadata and/or content to a search engine, an indexing engine, and/or other desired component.

Correspondingly, the index component 102 can use the handler 104 to capture metadata, content, and/or other information associated with an informational source or sources. The index component 102 can use the metadata, content, and/or other information for indexing against the information source or sources, such as a number of disparate file types. Thereafter, the informational source or information associated therewith can be located upon searching on the metadata, content, and/or other information. Accordingly, the index component 102 can use the handler 104 as part of indexing and/or searching operations. In one embodiment, the handler 104 provides a mechanism to unify the representation of metadata for any file format, and provides the associated metadata for use in indexing and/or searching.

In one embodiment, an indexing service can use the handler 104, in the form of a metadata IFilter for example, as an interface to interact with different types of files and/or other information sources (e.g., NFTS streams, etc.). The handler 104 can extract metadata, textual information, contextual information, properties, etc. for inclusion as part of an index associated with the indexing service. The index can be queried to locate desired information associated with the extracted metadata, textual information, contextual information, properties, etc. In another embodiment, the handler 104 can be configured as a dynamic-link library (DLL) that includes an implementation of a metadata IFilter for a specific class of files and/or data streams.

Figure 2:
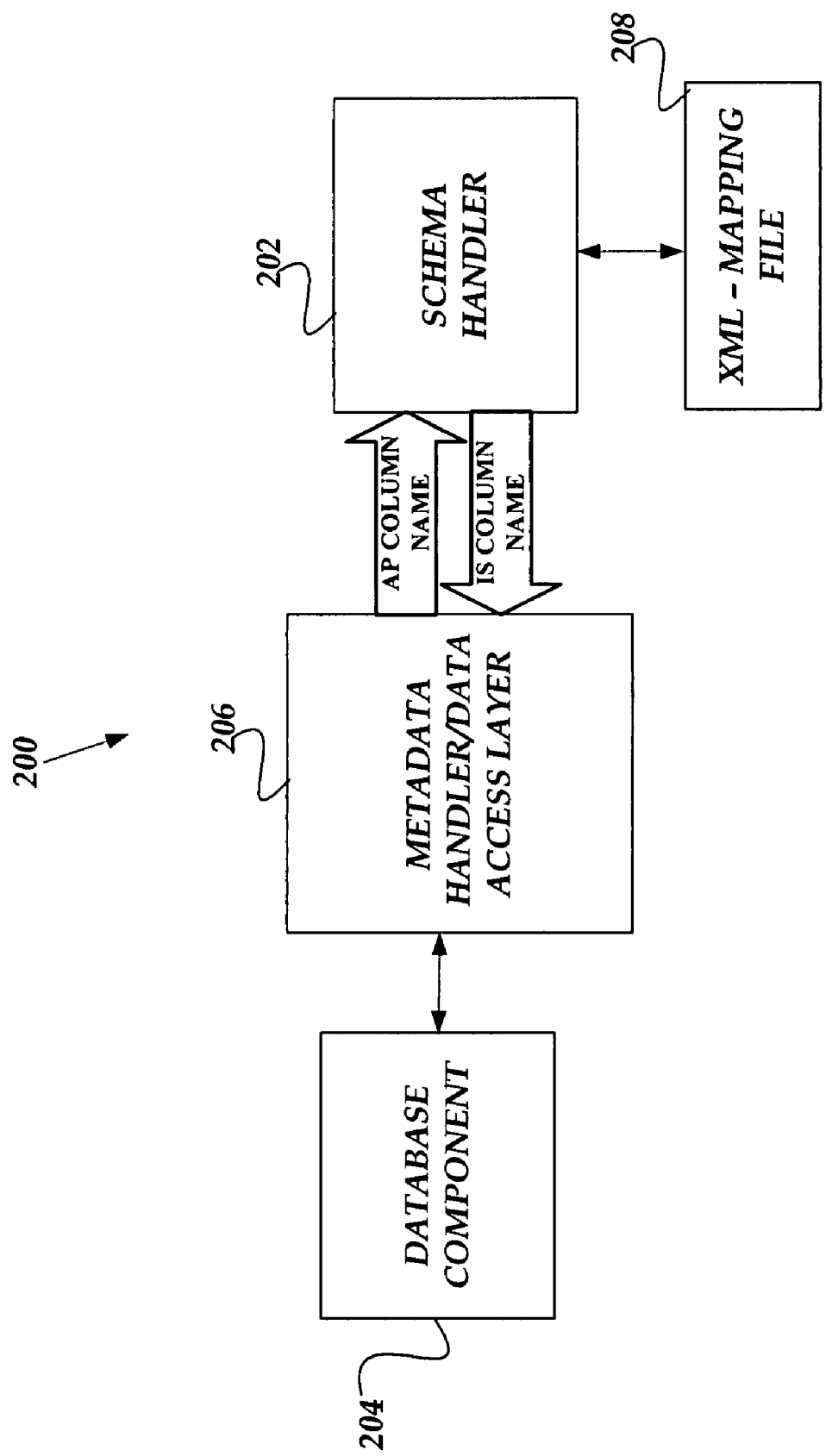
FIG. 2 depicts a block diagram of a system configured to manage information.

FIG. 2 is a block diagram depicting a system 200 that is configured to manage information, in accordance with an embodiment. As shown in FIG. 2, and for illustrative purposes, the schema handler 202 can operate to map a first schema type to a second schema type associated with a database component 204 or other storage component. For example, the schema handler 202 can be used to map application-specific metadata schema to a database metadata schema. Correspondingly, a metadata handler 206 (or data access layer) can use the schema handler 202 to map a first schema type to a second schema type associated with the database component 204. For example, the schema handler 202 can be used as part of an Assistance Platform rich client and the WINDOWS Desktop Search (WDS) database.

According to this embodiment, the schema handler 202 uses an xml-mapping file 208 as part of a mapping process, to thereby provide a data-driven mapping functionality, to map the first schema metadata to the second schema metadata. In one embodiment, the xml-mapping file 208 is a configuration file which includes an array of elements which describe the mapping for certain metadata. For example, the mapping for particular metadata can consist of the following elements: a) a first schema metadata name (e.g., AP) which is a standardized or friendly name which needs to be mapped; b) a second metadata name (e.g., WDS, IS, etc.) which is the name of the metadata in the database (e.g., the database associated with WDS); and, c) the type of the metadata (e.g., string, integer, multi-valued, etc.). In addition to the above array of mapping elements, the xml-mapping file 208 can also include a "catch-all" mapping element which is used to map an unspecified first schema metadata to a multi-valued metadata form in the database component 204.

As an example, the schema handler 202 can be used when using the metadata handler 206 as part of a content-based indexing operation. During the content indexing process, the metadata handler 206 receives an MDD file as an input. The MDD file references names associated with first metadata schema. To ensure correct indexing of the associated content, the first metadata schema (e.g., AP schema metadata) can be mapped to the second metadata schema (e.g., WDS schema metadata). Accordingly, the metadata handler 206 (e.g., metadata IFilter) uses the schema handler 202 to map the AP schema metadata names found in the MDD file to the appropriate metadata names associated with the WDS.

As another example, the schema handler 202 can be used as part of a searching and content retrieval process. In order to perform a search query over the database component 204, any metadata associated with the first schema query needs to be mapped to the metadata names of the second schema. Similarly, any metadata referenced in the search results need to be converted to the metadata names of the first schema. In order to obtain the correct metadata name, a data access layer or other component can use the schema handler 202 to perform the mapping operation.

Figure 3:
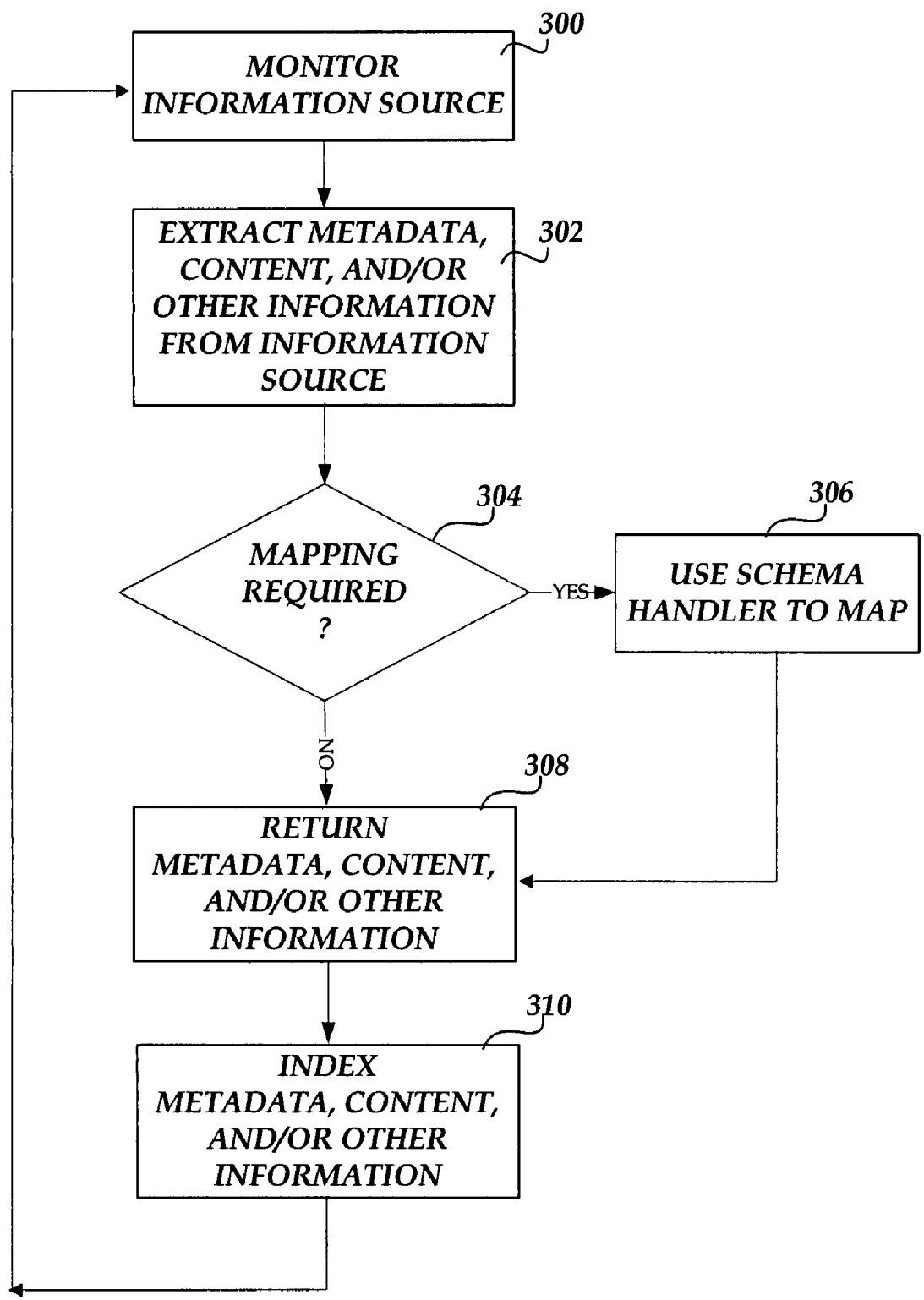
FIG. 3 is a flow diagram illustrating an indexing process.

FIG. 3 is a flow diagram illustrating a process of managing information, in accordance with an embodiment. Components of FIG. 1 are used in the description of FIG. 3, but the embodiment is not so limited. At 300, the index component 102 is monitoring an information source $106_i$. For example, the index component 102 may be monitoring a local hard disk, file system, folder(s), database, remote information source, or other data source. At 302, the index component 102 can operate to use the handler 104 to extract metadata, content, and/or other information from a select information source $106_i$. The index component 102 can refer to a persistent handler or GUID when calling the handler 104. For example, the index component 102 can call the handler 104 to extract metadata from a new or recently updated MDD file (described in detail below).

To simplify the discussion of FIG. 3, it is assumed that metadata has been extracted from an information source using the handler 104. After using the handler 104 to extract metadata from the information source 1061, the handler 104 invokes the schema handler 110 if there is a need to map the extracted metadata from a first metadata schema to a second metadata schema. For example, the schema handler 110 can be used to map from an application-specific metadata schema used by the information source $106_i$, to a metadata schema as understood by the index component 102.

If mapping is required at 304, the schema handler 110 is used to map the metadata from a first metadata schema to a second metadata schema at 306 and the flow proceeds to 308. If mapping is not required at 304, the flow proceeds to 308 and the metadata is returned to the index component 102 for further processing. At 310, the index component 102 operates to index the metadata as part of an indexing operation and associate this metadata with the information source $106_i$. Thereafter, the indexed metadata can be used to locate information associated with information source $106_i$ as part of a search. For example, the system 100 can operate to invoke a particular application based on the location, name, etc. of an underlying file or other information source that is associated with an MDD file.

Figure 4:
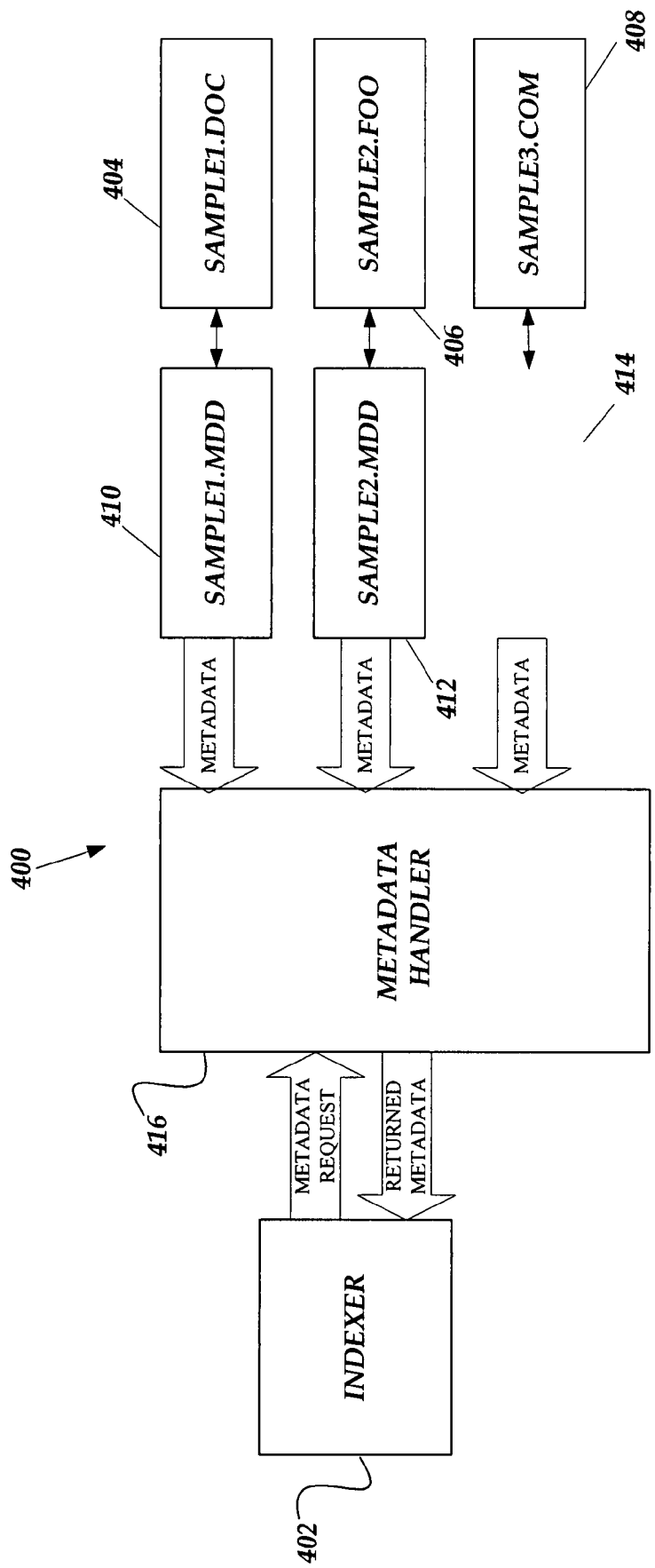
FIG. 4 depicts a block diagram of a system configured to manage information.

FIG. 4 is a block diagram of a system 400 configured to manage information, in accordance with an embodiment. Components of the system 400 can be configured to provide a representation of metadata that can be used as part of a heterogeneous indexing and/or a searching functionality. As shown in FIG. 4, the system 400 includes an indexer 402 that is configured to use metadata, in part, to provide an efficient indexing of information, such as a files, file content, metadata, etc.

The indexer 402 can use metadata and other information associated with a number of files 404 and 406, and other information source 408 to construct an indexed catalog to facilitate efficient and rapid searching. For example, the indexer 402 can use metadata extracted from locally stored files and/or remotely networked files when indexing. The embodiment is not so limited, but to provide an illustrative example of the functionality of the system 400, the files 404 and 406, and the information source 408 are depicted as particular types. However, the system 400 can interact with any number of files and/or other information sources. Moreover, the files and other information sources may be associated with another system, whether local or remote.

As described below, metadata can be associated with the files 404-406, and the information source 408, and stored according to a generic schema such that a single metadata handler can be used to interact with the associated metadata. As shown, block 404 corresponds with a document file (SAMPLE1.DOC). Block 410 depicts a corresponding MDD file (SAMPLE1.MDD) which includes the metadata and/or full-text associated with the document file. As described above, the metadata included in the MDD file is not constrained by the underlying format of the document file. Rather, each MDD file includes a data structure or format that enables the metadata handler 416 to extract or otherwise determine the metadata and other information associated therewith. Correspondingly, the metadata handler 416 can operate to indirectly interact with a number of associated information sources.

File 406 corresponds to a newly created file having a new type of format (SAMPLE2.FOO). Block 412 depicts a corresponding MDD file (SAMPLE2.MDD) which includes the metadata and/or full-text associated with the new file. Again, the metadata included in the MDD file is not constrained by the underlying format of the new file. Information source 408 corresponds with website URL (SAMPLE3.COM). Block 414 is a corresponding MDD file (SAMPLE3.MDD) which includes metadata associated with the website. Accordingly, the metadata included in the MDD file is not constrained by the fact that the underlying information source 408 is a website.

Due in part to the characteristics of the metadata handler 416, such as a metadata IFilter for example, and the MDD files, metadata and/or other information associated with each MDD file can be extracted therefrom or otherwise accessed. The extracted metadata and/or other information can be communicated to the indexer 402 for indexing purposes against the blocks 410, 412, and 414, files 404-406, and the information source 408. In one embodiment, the metadata handler 416 can be configured as an IFilter interface for interacting with an MDD file and/or a data stream associated with an underlying content-based or other type of file.

In an embodiment, one or more of the MDD files can be stored with or as part of an associated content file. In another embodiment, the metadata, content, and other information can be stored in the same file, in different files, or in different file combinations. Each MDD file can include properties to identify the file or informational source that is associated with the metadata. For example, an MDD file can include keywords, file name, author, file type, path, location(s), creation/modification/review date(s), size, binary information, language, custom properties, read/write permissions, and/or other information. In one embodiment, an MDD file can be created by an application configured to create a file having a certain file format and characteristics according to a defined schema.

An MDD file can be used to represent any file format, including existing and new file formats, data structures, or other constructs. For example, an MDD file can be associated with an image file, a document, spreadsheet, blog, uniform resource locator (URL), hyperlink, website, etc. An authoring tool, publishing tool, general purpose creation tool, etc. can be used to create an MDD file. In one embodiment, an application can automatically create an MDD based on an underlying file or other information source. A desired tool can be used to extract metadata from an associated file, application, or other informational or data construct when creating the MDD file.

For example, a metadata extraction tool can be used to create MDD files for document files, spreadsheet files, image files, video files, etc. The tool can be configured to extract metadata, content, and/or other information and publish the same as part of an MDD file. The system 400 can also include functionality to automatically create MDD files by using a sampling tool to extract metadata, content, and/or other information from a file, application, etc. and publish the same as part of an MDD file. As shown below, in one embodiment, a schema can be used to create MDD files using an extensible markup language (XML). Once an MDD file has been identified and/or located, the metadata handler 408 is configured to assess the metadata, content, and/or other information associated therewith for further operations and/or implementations.

Correspondingly, MDD files can be created in various ways and are not intended to be limited to any particular creation mechanism. In one embodiment, an MDD file can be created based in part on an existing metadata-embedded file. To create an MDD file from an existing metadata-embedded file, an associated IFilter for the file can be used to extract the metadata from the existing metadata-embedded file. For instance, a document IFilter can be used to extract metadata from a document file (e.g., .doc, .docx, etc.) when creating an MDD file to be associated with the document file. Code can be written to invoke the document IFilter which extracts metadata and/or full-text search (FTS) data from the document. The code can then create the MDD file associated with the document file including any relevant metadata and FTS data.

In another embodiment, an MDD file can be created using an authoring and publishing system. Such an embodiment can be used to create MDD files when integrated with authoring and publishing systems. An authoring and publishing system is designed to publish an "asset" to an online server, such as a runtime server for example, where assets are aggregated for search and content retrieval. An MDD adapter can be configured to extract metadata from an asset and any FTS data from the asset's associated content when creating an MDD file.

In yet another embodiment, an MDD file can be authored by using an authoring or other tool. A user can author an MDD file when the associated content is non-file based content, such as for a website for example. For example, a user can create an MDD file that includes annotations, keywords, notes, etc. stored as metadata and associated with a .pdf file. The MDD file can be authored as an XML file which can be created with user-specified metadata using a text editor, such as notepad for example. The metadata handler 416 can then operate to extract the metadata from the MDD file for indexing and/or searching operations.

An example schema corresponding to an MDD file is shown below. As shown, the schema is configured to be independent of content-type (virtual, file-based, etc), and can be used to describe metadata for heterogeneous content-types. The schema can include the following:

```xml
<?xml version="1.0" encoding="utf-16"?>
<xs:schema attributeFormDefault="unqualified"
elementFormDefault="qualified" xmlns:xs="http://www.w3.org/2001/XMLSchema">
    <xs:element name="assetAttributes">
     <xs:complexType>
      <xs:sequence>
       <xs:element name="assetKey">
        <xs:complexType>
         <xs:sequence>
          <xs:element name="product" type="xs:string" />
          <xs:element name="productRelease" type="xs:string" />
          <xs:element name="culture" type="xs:string" />
          <xs:element name="assetId" type="xs:string" />
          <xs:element name="assetVersion" type="xs:unsignedByte" />
         </xs:sequence>
        </xs:complexType>
       </xs:element>
       <xs:element name="isTocAsset" type="xs:unsignedByte" />
       <xs:element name="isRoot" type="xs:unsignedByte" />
       <xs:element name="isCategory" type="xs:unsignedByte" />
       <xs:element name="assetType" type="xs:string" />
       <xs:element name="title" type="xs:string" />
       <xs:element name="description" />
       <xs:element name="source" type="xs:string" />
       <xs:element name="primaryProxyKey" type="xs:string" />
       <xs:element name="principalAssetKey" type="xs:string" />
       <xs:element name="contentType" type="xs:string" />
       <xs:element name="contentName" type="xs:string" />
       <xs:element name="isPackaged" type="xs:unsignedByte" />
       <xs:element name="isPlaceHolder" type="xs:unsignedByte" />
       <xs:element name="placeHolderId" />
       <xs:element name="collections" />
       <xs:element name="keywords" />
       <xs:element name="parents" />
       <xs:element name="properties" />
      </xs:sequence>
     </xs:complexType>
    </xs:element>
</xs:schema>
```

MDD files can be used for various assets. Each MDD file can include information to identify the associated content. The MDD file can also provide information about specialized applications for different metadata sets associated with the same content. For example, consider an information source which is a jpeg file. The jpeg file may have different applications depending on which context it is being used in. These applications could be a Picture Library, a web site, a backup utility, etc. The relevant metadata associated with the jpeg file for each of these applications could be different. Thus, there could be three different MDD files associated with the same content which is the jpeg file, wherein each MDD file describes the metadata for each of the aforementioned applications.

For example, an MDD file for table of content (TOC) assets can include the following:

```xml
<?xml version="1.0" encoding="utf-16"?>
<assetAttributes>
 <assetKey>
  <product>ABC</product>
  <productRelease>VS</productRelease>
  <culture>en-US</culture>
  <assetId>123456-1234-1234-1234-1234567890</assetId>
  <assetVersion>1</assetVersion>
 </assetKey>
 <isTocAsset>1</isTocAsset>
 <assetType>category</assetType>
 <title>Sample toc MDD file</title>
 <description>This is a sample toc MDD file</description>
 <source>http://assistance.com</source>
 <principalAssetKey>RealAssetsAssetKey</principalAssetKey>
 <isRoot>1</isRoot>
 <isPlaceHolder>1</isPlaceHolder>
 <placeHolderID>C# content<placeHolderID>
 <collections>
```

```
        <collection>XYZ</collection>
      </collections>
      <parents>
        <parent order="1" primaryParent="1">SomeProduct#SomeRelease#en-us#05eee553-6a90-456a-b9e5-fcb423390543#1</parent>
        <parent order="3" primaryParent="0">SomeOtherProduct#Release1#en-us#098765-1234-5678-9012-1234567890#1</parent>
      <parents>
      <properties>
        <property name="PN0">PV0</property>
        <property name="PN1">PV1</property>
      </properties>
  </assetAttributes>
```

Table 1 below includes a description of various elements included above.

TABLE 1

| Item | Description |
|---|---|
| assetAttributes | This is the root element of the MDD file |
| assetKey | This describes the 5-part asset key for this asset. The 5 parts of the asset key can be stored in separate columns. Additionally, the ToString( ) version of the asset key can be stored in a separate column |
| isTocAsset | Value of 0 or 1 |
| assetType | User-defined asset type |
| title | Title of the asset |
| Description | Summary/Description of the asset |
| Source | Online source for the asset. If updating assets in the background, use this URL to connect to the server |
| principalAssetKey | Asset key (ToString) of the real asset that this node links to |
| isRoot | Identifies if root node |
| isPlaceHolder | Identifies if place holder |
| placeHolderID | The place holder id of this node if it is a place holder. Ignored if it is not a place holder |
| collections | An asset can be part of multiple collections. This multi-value field would be used during filtering and scoping of content |
| Parents | The assetIds of the parents of this toc node. Also specifies the order within the parent. Order is sorted. So if order is 3 and there is no 1 or 2 for this parent, then this node would be displayed as 1st child of the parent |
| primaryParent (attribute on parent) | The toc proxy asset of the primary parent of this node. Used for breadcrumbs |
| properties | This is a bag of properties that the author can specify. These properties can be used during filtering |

An example MDD file for non-table of content (non-TOC) assets can include the following:

```
<?xml version="1.0" encoding="utf-16"?>
<assetAttributes>
  <assetKey>
    <produc>ABC</product>
    <productRelease>VS</productRelease>
    <culture>en-US</culture>
    <assetId>01fc4051-2995-4aa0-a19e-c5778153f165</assetId>
    <assetVersion>1</assetVersion>
  </assetKey>
  <isTocAsset>0</isTocAsset>
  <assetType>topic</assetType>
  <title>Sample MDD file</title>
  <description>This is a sample MDD file</description>
  <source>http://assistance.com</source>
  <primaryProxyKey>VS#en-us#123456-6a90-456a-b9e5-fcb423390543#1</primaryProxyKey>
  <contentType>aml</contentType>
  <contentName>sample.aml</contentName>
  <collections>
    <collection>XYZ</collection>
  </collections>
  <keyWords>
    <keyword>sample</keyword>
    <keyword>example</keyword>
  </keywords>
  <queries>
    <query>some query</query>
    <query>some query</query>
  </queries>
  <bestBetQueries>
    <bestBetQuery>some best bet</bestBetQuery>
    <bestBetQuery>some best bet</bestBetQuery>
  </bestBetQueries>
  <properties>
    <property name="PN0">PV0</property>
    <property name="PN1">PV1</property>
  </properties>
```

<ftsData>What are the risks of allowing programs through a firewall? When you create an exceptionView definition or open a portView definition in a firewall, you allow a particular program to send information to or from your computer through the firewall. Allowing a program to communicate through a firewall (sometimes called unblocking) is like opening a tiny door in the firewall. Each time you allow an exception or open a port for a program to communicate through a firewall, your computer becomes a bit less secure. The more exceptions or open ports your firewall has, the more opportunities there are for hackers or malicious software to use one of those openings to spread a worm, access your files, or use your computer to spread malicious software to others. It's generally safer to create exceptions than to open ports. If you open a port, it stays open until you close it, whether or not a program is using it. If you create an exception, the "door" is open only when needed for a particular communication. To help decrease your security risk: Only create an exception or open a port when you really need to, and remove exceptions or close ports that you no longer need. Never create an exception or open a port for a program that you do not recognize. See also Firewall: frequently asked questions What are network categories?

```
  </ftsData>
</assetAttributes>+
```

Table 2 below includes a description of various elements included above.

TABLE 2

| Item | Description |
| --- | --- |
| assetAttributes | This is the root element of the MDD file |
| assetKey | This describes the 5-part asset key for this asset. The 5 parts of the asset key can be stored in separate columns. Additionally, the ToString( ) version of the asset key can be stored in a separate column |
| isTocAsset | Value of 0 or 1 |
| assetType | User-defined asset type |
| title | Title of the asset |
| Description | Summary/Description of the asset |
| Source | Online source for the asset. If updating assets in the background, use this URL to connect to the server |
| primaryProxyKey | The toc proxy asset to sync to during TOC sync |
| contentType | Extension of the content file associated with this asset. This can also be used for FTS data when chaining. also useful for virtual, binary, and other formats (e.g., URL, STTP, etc.) |
| contentName | Name of the content file. This can also be used during off-line content indexing and for online-cached content indexing |
| collections | An asset can be part of multiple collections. This multi-value field would be used during filtering and scoping of content |
| keywords | A multi-value field specified the keywords associated with this asset. This is used for displayed keyword index |
| properties | This is a bag of properties that the author can specify. These properties can be used during filtering |
| queries | A multi-valued field for query to asset mappings. In their original authored form these distinct objects (not assets), but here they can be mapped to become properties on asset objects |
| bestBetQueries | A multi-valued field for best bets |
| ftsData | fts data for the content can be specified in this field. In some cases, it may not be feasible to specify fts data in the content file (such as for image files, for example). If fts data is specified here, then only this content would be used for fts, and fts data may not be retrieved from the content file |

An additional example of an MDD file is shown below and includes:

```
<assetAttributes>
  <assetKey>
    <assetId>00e69dca-3820-4215-96aa-4fc7ade34aec</assetId>
    <assetVersion>4</assetVersion>
    <culture>en-US</culture>
    <product>ddaf8136-402d-4a02-aa43-c384f26796ea</product>
    <productRelease>CCB2</productRelease>
  </assetKey>
  <isTocAsset>0</isTocAsset>
  <assetType>Topic</assetType>
  <title>Accessibility Products and Services from Microsoft
  </title>
  <description>
  </description>
  <source>local</source>
  <primaryProxyKey>####</primaryProxyKey>
  <contentType>aml</contentType>
  <contentName>00e69dca-3820-4215-96aa-4fc7ade34aec#en-US#ddaf8136-402d-4a02-aa43-c384f26796ea#CCB2#4</contentName>
  <isPackaged>0</isPackaged>
  <collections />
  <keywords />
```

-continued

```
  <queries />
  <bestBetQueries />
  <properties>
    <property name="TocTitle">
    </property>
  </properties>
```

<ftsData> Accessibility Products and Services is committed to making its products and services easier for everyone to use. The following topics provide information about the features, products, and services that provide better access for people with disabilities: 1) Accessibility features in alternative formats; 2) Customer service for people with hearing impairments. You can contact your subsidiary to find out whether the type of products and services described in this section are available in your area. The operating system has many built-in accessibility features that are useful for individuals who have difficulty typing or using a mouse, are blind or have low vision, or who are deaf or hard-of-hearing. The features are installed during Setup. Free step-by-step tutorials provide detailed procedures for adjusting the accessibility options and settings on your computer. This information is presented in a side-by-side format so that you can learn how to use the mouse, the keyboard, or a combination of both. Documentation in alternative formats is available for users who have difficulty reading or handling printed materials. </ftsData>
</assetAttributes>

Figure 5:
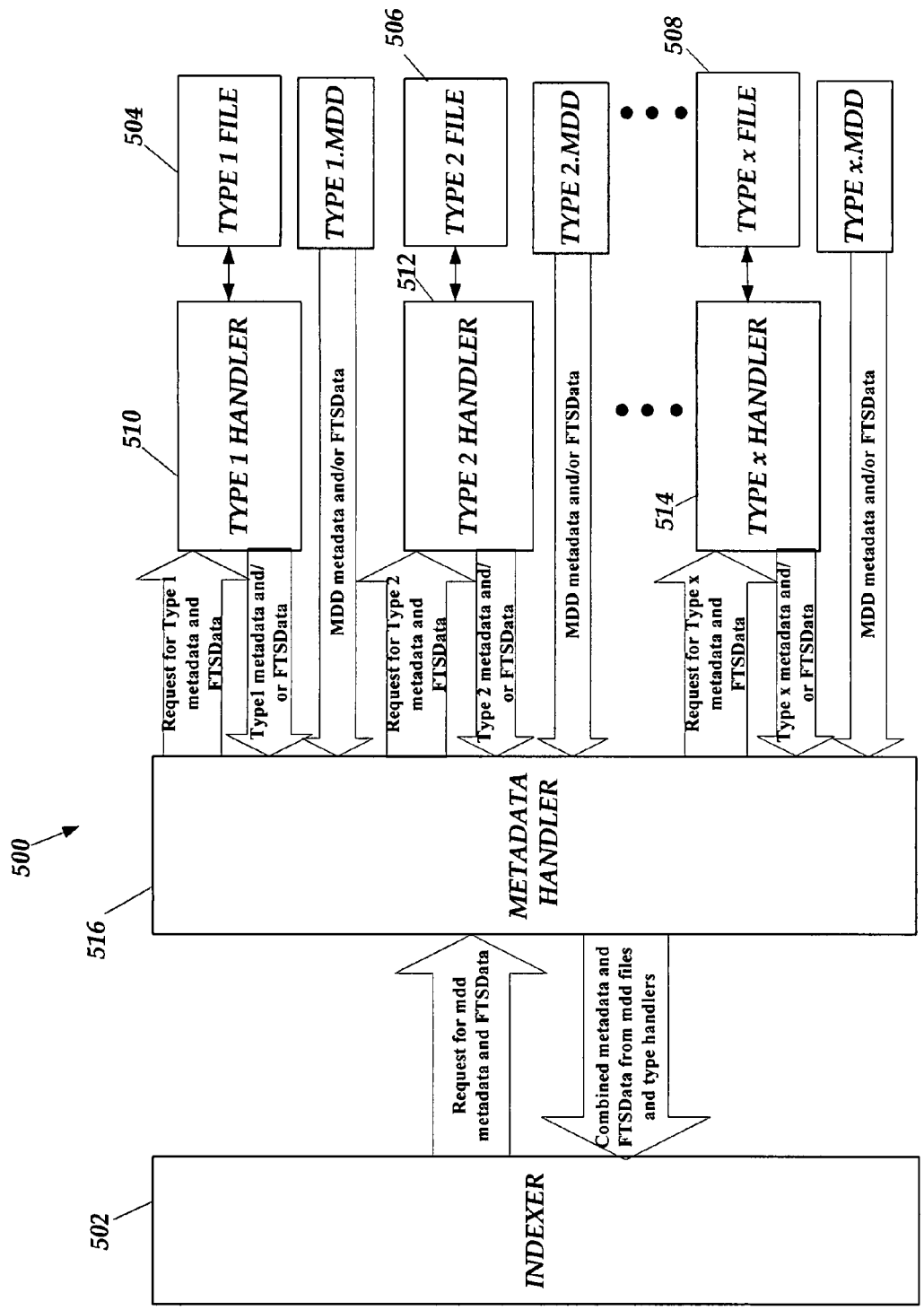
FIG. 5 depicts a block diagram of a system configured to manage information.

FIG. 5 is a block diagram of a system 500 configured to manage information, in accordance with an embodiment. The system 500 can be configured to associate information including metadata and/or full-text search data (FTSData) with various information types, such as a number of disparate file types for example. In one embodiment, FTSData can include free-form text data or full-text-search data and can be included as part of an MDD file (see Table 2 and the MDD file example above). Correspondingly, a user or application can search against the text using full-text-search capabilities.

As described below, text and other information that is specified in an MDD file as FTSData can be returned to the indexer 102 (and/or search engine) as free-form text. A user can create an MDD file to include the FTSData which can provide additional information about an underlying information source. Moreover, the user can include FTSData in the MDD file to describe aspects of the MDD file. The system 500 can use metadata and/or FTSData as part of indexing and/or searching operations. For example, the system 500 can be configured to extract metadata and/or FTSData from an MDD file for use in indexing and searching operations. As described above, FTSData can be included as part of an MDD file, wherein the MDD file can be associated with any type of file, content, or other data construct.

As shown in FIG. 5, the system 500 includes an indexer 502 that is configured to use metadata, in part, to provide an efficient indexing of information, such as for files, file content, metadata, FTSData, etc. The indexer 502 can use metadata, FTSData, and other information to construct an indexed catalog or data structure to facilitate efficient and rapid searching. For example, the indexer 502 can use metadata extracted from locally stored files, remotely networked files, and/or other information sources when indexing information associated therewith.

To provide an illustrative example of the functionality of the system 500, a number of files are depicted to include a type 1 file 504, a type 2 file 506, and a type x file 508.

Accordingly, the system 500 can include or be associated with any number of files of disparate types. For example, the type 1 file 504 may be a .pdf type file. A user may want to overcome certain limitations associated with a .pdf type file by using an associated MDD file (shown as type 1.mdd in FIG. 5) to associate a number of annotations and additional metadata (e.g., Category) with the .pdf file. A user can use components of the system 500 to eliminate a distinction between data and metadata that is part of the .pdf file by using metadata and FTSData that can be added to an associated MDD file. As described below, the indexer 502 can use the annotations in the form of FTSData and additional metadata of an associated MDD file to index against the .pdf file.

Continuing with the illustrative example, the type 2 file 506 may be an image file (e.g., .jpg). Again, a user may want to overcome certain limitations associated with the image file by using an associated MDD file (shown as type 2.mdd in FIG. 5). For example, the user may want to associate blog text with the image file. The indexer 502 can use the blog text in the form of FTSData and/or additional metadata of the associated MDD file to index against the image file. As described herein, MDD files can be associated with any type of file or other data construct, including information sources yet to be defined. Thus, the type x file 508 can refer to any type of file or data construct. Moreover, while the files 504-508 are shown as part of the system 500, the files 504-508 may be associated with other systems, networks, etc. The system 500 can also be used to interact with other files and information sources which may be associated with some other system, whether local or remote.

As shown in FIG. 5, the system 500 includes a type 1 handler 510 that can be used to extract metadata and other information from the type 1 file. For example, the type 1 handler 510 can be implemented as a .pdf IFilter for an associated .pdf file and can extract metadata and other .pdf data from the .pdf file. The system 500 also includes a type 2 handler 512 that can be used to extract metadata and other information from the type 2 file. For example, the type 2 handler 512 can be implemented as a .jpg IFilter for an associated .jpg file and can extract metadata and other .jpg data from the .jpg file. A type x handler 514 is associated with the type x file 508 and can be configured to extract metadata and other information from the type x file 508. The type x handler 514 illustrates that the system 500 can include various handlers for different file types, such as a number of IFilters.

The system 500 also includes a metadata handler 516 that is configured to extract metadata and other information, FTSData for example, from an associated file type, such as an MDD file, or data stream. As shown in FIG. 5, an MDD file (type 1.MDD, type 2.MDD, and type x.MDD) is associated with an associated file type (type 1 file 504, type 2 file 506, and type x file 508 respectively). Each MDD file can include code and other properties to identify the file or informational source that is associated with the metadata and/or FTSData. As described above, metadata and other information can be included with the MDD files according to a schema such that the metadata handler 516 can be used to interact with the associated metadata and other information.

Thus, a user can add metadata and FTSdata to an associated MDD file which can be used by the metadata handler 516 as part of an indexing operation associated with disparate file types (e.g., type 1 file, type 2 file, etc.) Moreover, the metadata included in the MDD file is not constrained by the underlying format of the associated file type. Correspondingly, each MDD file includes a data structure or format that enables the metadata handler 516 to extract or otherwise determine the metadata and other information, such as FTSData for example, associated therewith. An MDD file can be used to represent any file format, including existing and new file formats, data structures, or other constructs. For example, an MDD file can be associated with an image file, a document, spreadsheet, blog, uniform resource locator (URL), hyperlink, website, etc. An authoring tool, publishing tool, general purpose creation tool, etc. can be used to create an MDD file. In one embodiment, an application can automatically create an MDD file based on an underlying file or other information source.

Due in part to the characteristics of the metadata handler 516, such as a metadata IFilter for example, and the MDD files, metadata and/or other information associated with each MDD file can be extracted therefrom or otherwise accessed. For example, extracted metadata and/or FTSData can be communicated to the indexer 502 for indexing and searching purposes against a number of disparate file or information types. In one embodiment, the metadata handler 516 can be configured as an IFilter interface for interacting with an MDD file and/or a data stream associated with an underlying content-based or other type of file or data construct.

In one embodiment, the metadata handler 516 can operate to request metadata and/or other information (e.g., FTSData) from the various types of handlers, also referred to as "chaining." The metadata handler 516 can also extract metadata and other information from a number of information sources, such as one or more MDD files for example. For example, the metadata handler 516 can extract metadata from an MDD file that is associated with an underlying information source or as a stand-alone data source (e.g., TOC MDD file). As shown, the metadata handler 516 is operating as an intermediate handler and is requesting: type 1 metadata and FTSData from the type 1 handler 510; type 2 metadata and FTSData from the type 2 handler 512; and, type x metadata and FTSData from the type x handler 514.

Accordingly, the metadata handler 516 can operate as a gatekeeper or intermediary between any registered handlers and the indexer 502. Since each handler 510 514 (e.g., IFilters) can be configured to extract metadata and other information from an associated file type or other information source, the metadata handler 516 can call or chain one or more of the handlers 510-514 when requesting metadata and other information, thereby creating a chain of handlers (e.g., a chain of IFilters). Correspondingly, each handler 510-514 can return metadata and/or FTSData from an associated underlying file or data construct based in part on the metadata handler 516 request.

Moreover, the metadata handler 516 can operate to extract metadata and/or FTSData from an associated MDD file (see Table 2 and the associated schema above). By including FTSData in an MDD file, a user is able to add annotations, comments, and other text that would not normally be associated with the underlying information source due to a certain predetermined or unmanageable format. Correspondingly, indexing and searching components can use the FTSData to provide full-text-search capabilities including metadata search capabilities. In one embodiment, the metadata handler 516 can be configured to contemporaneously or alternately extract metadata and/or FTSData from a number of MDD files. In another embodiment, multiple metadata handlers can be linked with other handlers to extract information from an underlying information source.

The metadata handler 516 can use metadata and/or FTSData as provided by another handler that operates to extract metadata and/or FTSData from an associated file or other information source (e.g., .pdf, .jpg, .doc, .wav, yet to be defined, etc.). For example, the metadata handler 516 can use a number of disparate IFilters to extract metadata and/or FTSData from a number of associated files. In an embodiment, the metadata handler 516 can operate to combine and/or communicate metadata and/or FTSData from the disparate handlers with the corresponding metadata and/or FTSData from a number of MDD files. The metadata handler 516 can be controlled to operate (e.g., mode of operation setting) in a desired way so that metadata and/or FTSData can be returned to the indexer 502 or other component according to a defined mode. Thus, the metadata handler 516 can return the metadata and/or FTSData, combined according to the mode of operation, to the indexer 502 as if it were part of an MDD file.

A user can associate FTSData with a file or other information source by using the capability provided by the inclusion of an FTSData element to an MDD schema. In one embodiment, the FTSData element includes a free-form text value, and can be communicated (e.g., pushed) to the indexer 502 and/or search engine as FTSData for an associated MDD file. By associating the MDD file with the linked content, the FTSData can be visualized as if it is part of the linked content and thereby providing additional information that an indexing or searching application can use for indexing and searching operations. Moreover, a user can associate additional information with a file or other information source, enabling a broader range of identification functionality to the user.

As described above, a number of handlers can operate together (e.g., handler chaining) to collaboratively return metadata and/or FTSData from associated files or information sources. Since an MDD file can include information about the content-type of an associated file or other information source, the metadata handler 516 can look up and use a registered handler (e.g., IFilter) in a similar fashion as to how the indexer 502 can use registered handlers. Correspondingly, when the indexer 502 invokes the metadata handler 516 and requests metadata and/or FTSData from an MDD file, the metadata handler 516 in turn invokes the associated handler for the specified content-type; requesting metadata and/or FTSData from the underlying information source, such as an associated or linked content file or other data construct for example. Thereafter, the metadata handler 516 can communicate a desired combination of the metadata and/or FTSData to the indexer 502 as if the information is actually part of the MDD file. The same or similar sequence can be used when a search engine or application requests FTSData from an MDD file.

In an embodiment, the metadata handler 516 includes functionality to operate according to a number of different modes of operation. A number of settings (e.g., global settings, settings specified per MDD file, settings specified per indexing and/or searching scenario, etc.) can be used to control the operational mode of the metadata handler 516. In one embodiment, the metadata handler 516 can be configured to operate according to the following modes, but is not so limited:

1. Append with MDD Priority:
a. FTSData from a MDD file (if any) is appended to FTSData from an information source associated with a MDD file (if any) and returned to the indexer 502.
b. Single-valued metadata types (e.g. Title): a union of metadata from the MDD file and content is returned to the indexer 502. If there is a metadata name conflict, the corresponding metadata from the content is ignored.
c. Multi-valued metadata types (e.g. keywords): a union of metadata from the MDD file and content is returned to the indexer 502. If there is a metadata name conflict, a union of the values from the content and MDD file is returned to the indexer 502.

For example, the following describes a sequence of operations associated with the append with MDD priority mode:

First, the indexer 502 sees a new file "MyVacationPicture.mdd." MyVacationPicture.mdd is the MDD file that is associated with and linked to a picture file "MyVacationPicture.jpeg." The indexer 502 can then call on and load the metadata handler 516 which requests metadata and/or FTSData from the MDD file. Since the metadata handler 516 knows that the associated content is a jpeg file, it can load a handler (e.g., handler 510) associated with the jpeg file (e.g., jpeg IFilter) and requests metadata from the jpeg file. The jpeg handler extracts metadata, but since there is no FTSData, the jpeg handler will only return the extracted metadata.

The metadata handler 516 operates to combine the metadata from the jpeg file with the metadata from the MDD file according to the specified mode. The MDD file includes an FTSData specification which includes blog text that is associated with the picture. Then, the metadata handler 516 returns the metadata and FTSData to the indexer 502. Thereafter, the indexer 502, even if unaware of the underlying information source (jpeg file) or the handler 510 for jpeg files (e.g., jpeg IFilter), indexes this metadata and FTSData as if belonging to the MDD file. A user is now able to search against the metadata and the FTSData emitted by the metadata handler 516.

2. Append with Content Priority:
a. FTSData from the MDD file (if any) is appended to FTSData from content (if any) and returned to the indexer 502.
b. Single-valued metadata types (e.g. Title): a union of metadata from the MDD file and content is returned to the indexer 502. If there is a metadata name conflict, the corresponding metadata from the MDD file is ignored.
c. Multi-valued metadata types (e.g. keywords): a union of metadata from the MDD file and content is returned to the indexer 502. If there is a metadata name conflict, a union of the values from the content and MDD file is returned to the indexer 502.

3. Overwrite with MDD Priority:
a. If any FTSData is specified in MDD file, FTSData (if any) from content is ignored, else FTSData (if any) from content is returned to the indexer 502.
b. Single-valued metadata types (e.g. Title): a union of metadata from the MDD file and content is returned to the indexer 502. If there is a metadata name conflict, the corresponding metadata from the content is ignored.
c. Multi-valued metadata types (e.g. keywords): a union of metadata from the MDD file and content is returned to the indexer 502. If there is a metadata name conflict, the corresponding metadata from the content is ignored.

4. Overwrite with Content Priority:
a. If any FTSData is specified in content, FTSData (if any) from MDD file is ignored, else FTSData (if any) from the MDD file is returned to the indexer 502.
b. Single-valued metadata types (e.g. Title): a union of metadata from the MDD file and content is returned to the indexer 502. If there is a metadata name conflict, the corresponding metadata from the MDD file is ignored.
c. Multi-valued metadata types (e.g. keywords): a union of metadata from the MDD file and content is returned to the indexer 502. If there is a metadata name conflict, the corresponding metadata from the MDD file is ignored.

5. Chain for FTSData Only:
a. If any FTSData is specified in the MDD file, FTSData (if any) from content is ignored, else FTSData (if any) from content is returned to the indexer 502.

b. All metadata comes from the MDD file. Metadata from content is ignored.

6. Fine-Granularity Chaining:

a. In this mode, each metadata element in the MDD file specifies which metadata-value will take priority in case of a conflict between MDD file and content. If the MDD file does not specify anything, global settings can be used to disambiguate.

Figure 6:
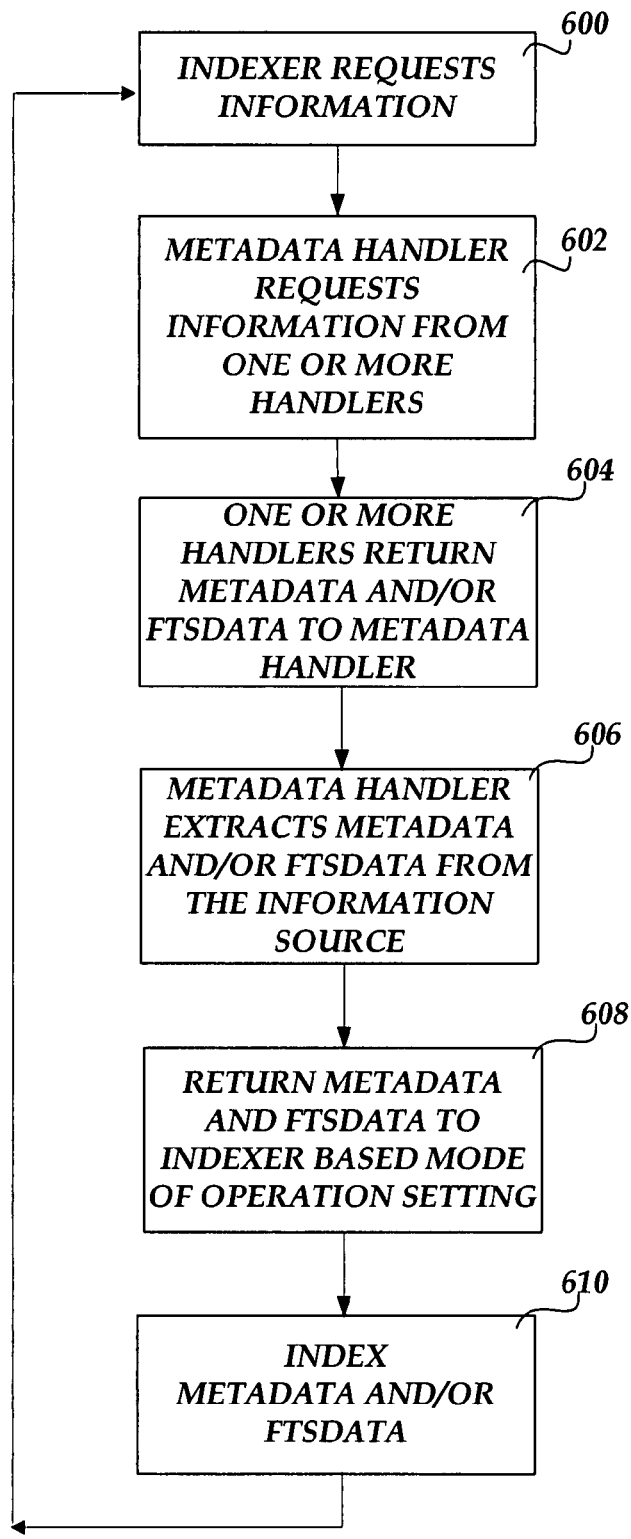
FIG. 6 is a flow diagram illustrating an indexing process.

FIG. 6 is a flow diagram illustrating a process of managing information, in accordance with an embodiment. Components of FIG. 5 are used in the description of FIG. 6, but the embodiment is not so limited. At 600, the index component 502 sees a new file or information source, such as an MDD file for example, and requests information therefrom. For example, the indexer 502 may be monitoring a local hard disk, file system, folder(s), database, remote information source, or other data source. As part of the request, the indexer 502 can call on the metadata handler 516 to extract metadata and/or FTSData from the information source. At 602, the metadata handler 516 can operate to call on one or more handlers to return information associated with any linked content that is associated with the information source.

At 604, one or, more handlers can return metadata and/or FTSData from any linked content. At 606, the metadata handler 516 operates to extract metadata and/or FTSData from the new information source. At 608, the metadata handler 516 can operate to return the metadata and/or FTSData returned by the one or more handlers with the metadata and/or FTSData extracted from the information source based in part on a desired setting (e.g., see mode settings above). At 610, the indexer 502 can operate to index the returned metadata and/or FTSData. Thereafter, the indexed metadata and/or FTSData can be used to locate information as part of a search. For example, the system 500 can operate to invoke an application based in part on the location, name, etc. of an information source that is associated with an MDD file.

In one embodiment, a metadata handler, such as a metadata IFilter for example, can be configured as a software application, including executable instructions, having a number of modules that are configured as follows.

The metadata handler can include an amlProcessor.h module which corresponds with a header file used for processing AML files and includes:

```
#pragma once
#include "stdafx.h"
// CAmlProcessor code derived from APV1 compiler.
class amlProcessor
{
public:
    amlProcessor( ) {};
    ~amlProcessor( ) {};
    void ExtractBody(const CString & amlFile, CComBSTR &bstrBody)
    {
        HRESULT hr = S_OK;
        // Create XML DOM From URL.
        CComPtr    <IXMLDOMDocument2>    pXmlDoc    =
XmlUtil::CreateXmlDomFromUrl(CComBSTR(amlFile));
        if (!pXmlDoc)
        {
            bstrBody = L"";
            return;
        }
        // Set the MAML namespace as the namespace to be
        // used in XPath expressions.
        CComVariant varValue (GetMamlNamespace( ));
        if  (FAILED  (hr = pXmlDoc->setProperty(L"SelectionNamespaces",
varValue)))
        {
            bstrBody = L"";
            return;
        }
        CComBSTR bstrXsl(500);
        InitializeXSL(bstrXsl);
        // Create XSL Doc from BSTR
        CComPtr<IXMLDOMDocument2>    pXslDoc    =
XmlUtil::CreateXmlDom(bstrXsl);
        if (!pXslDoc)
        {
            bstrBody = L"";
            return;
        }
        // Use the above xsl transform to extract the body
        if(FAILED (hr = pXmlDoc->transformNode(pXslDoc, &bstrBody)))
        {
            bstrBody = L"";
            return;
        }
    }
private:
    WCHAR *GetamlNamespace( )
    {
        return L"xmlns:maml='http://schemas.microsoft.com/maml/2004/10'";
    }
```

-continued

```
        void InitializeXSL(CComBSTR &bstrXsl)
        {
            bstrXsl = L"<?xml version=\"1.0\" encoding=\"UTF-8\" ?>\r\n";
            bstrXsl.Append("<xsl:stylesheet                version=\"1.0\"
xmlns:xsl=\"http://www.w3.org/1999/XSL/Transform\" ");
            bstrXsl.Append(GetMamlNamespace( ));
            bstrXsl.Append(" xml:space=\"default\" > \r\n");
            bstrXsl.Append("<xsl:output method=\"text\" indent=\"no\" />\r\n");
            bstrXsl.Append("<xsl:template match=\"Λ\">\r\n");
            bstrXsl.Append("<xsl:apply-templates />\r\n");
            bstrXsl.Append("</xsl:template>\r\n");
            bstrXsl.Append("<xsl:template match=\"text( )\">\r\n");
            bstrXsl.Append("<xsl:text> </xsl:text><xsl:value-of select=\".\" /><xsl:text
xml:space=\"preserve\"> </xsl:text>\r\n");
            bstrXsl.Append("</xsl:template>\r\n");
            bstrXsl.Append("<xsl:template
match=\"/maml:task[@contentType='ACWProcedure']//maml:taskExecutionBlock\">\r\n");
            bstrXsl.Append("</xsl:template>\r\n");
            bstrXsl.Append("<xsl:template match=\"//maml:title\">\r\n");
            bstrXsl.Append("</xsl:template>\r\n");
            bstrXsl.Append("<xsl:template match=\"//maml:reusableContent\">\r\n");
            bstrXsl.Append("</xsl:template>\r\n");
            bstrXsl.Append("</xsl:stylesheet>");
        }
    };
```

The metadata handler can include a dll.cpp module which is standard ATL attributed stub code that can be used to generate common DLL exports and includes:

```
// APMetaDataFilter.cpp : Implementation of DLL Exports.
#include "stdafx.h"
#include "hxutil.h"
#include "resource.h"
// The module attribute causes DllMain,
DllRegisterServer and DllUnregisterServer to be automatically
implemented
    [ module(dll, uuid = "{94727D5F-9450-4160-8B42-
    E7E55B910D0B}",
```

-continued

```
    name = "MDDFilter",
    helpstring = "Ap MDD IFilter 1.0 Type Library",
    resource_name = "IDR_MDDFILT") ] ;
```

The metadata handler can include a mddfilt.cpp module which implements the IFilter COM interface. An index component can operate to call the mddfilt.cpp module after encountering a file, such as an MDD file for example, or information associated therewith, to thereby request the associated metadata and/or full-text data. The mddfilt.cpp includes the following:

```
            bstrXsl.Append("</xsl:template>\r\n");
            bstrXsl.Append("<xsl:template match=\"text()\">\r\n");
            bstrXsl.Append("<xsl:text> </xsl:text><xsl:value-of select=\".\" /><xsl:text
xml:space=\"preserve\"> </xsl:text>\r\n");
            bstrXsl.Append("</xsl:template>\r\n");
            bstrXsl.Append("<xsl:template
match=\"/maml:task[@contentType='ACWProcedure']//maml:taskExecutionBlock\">\r\n");
            bstrXsl.Append("</xsl:template>\r\n");
            bstrXsl.Append("<xsl:template match=\"//maml:title\">\r\n");
            bstrXsl.Append("</xsl:template>\r\n");
            bstrXsl.Append("<xsl:template match=\"//maml:reusableContent\">\r\n");
            bstrXsl.Append("</xsl:template>\r\n");
            bstrXsl.Append("</xsl:stylesheet>");
        }
    };
```

```
// APMetaDataFilter.cpp : Implementation of DLL Exports.
#include "stdafx.h"
#include "hxutil.h"
#include "resource.h"
// The module attribute causes DllMain, DllRegisterServer and
DllUnregisterServer to be automatically implemented
[ module(dll, uuid = "{94727D5F-9450-4160-8B42-E7E55B910D0B}",
    name = "MDDFilter",
    helpstring = "Ap MDD IFilter 1.0 Type Library",
    resource_name = "IDR_MDDFILT") ] ;

#include "windows.h"
#include "stdafx.h"
```

```cpp
#include <atlsimpcoll.h>
#include <atlwin.h>
#include <atltypes.h>
#include <atlctl.h>
#include <atlhost.h>
#include <filter.h>
#include <filterr.h>
#include <atlcoll.h>
#include <comutil.h>
#include <comdef.h>
#include <atlstr.h>
#include <map>
#include <set>
using namespace ATL;
//Removing atlsafe.h, to resolve any linker errors
// For use in top-level COM interface method implementations
#define MDDFILT_COM_BEGIN(x)                        \
    HRESULT x = S_OK;                               \
    try                                             \
    {
#define MDDFILT_COM_END(x)                          \
    }                                               \
    catch(CAtlException& e)   { x = HRESULT(e);}    \
    catch(std::bad_alloc&)    { x = E_OUTOFMEMORY;} \
    catch(std::exception&)    { x = E_UNEXPECTED;}  \
    return x;
```

```
#include "mddfilt.h"
#include <strsafe.h>
#include <stdio.h>
#include <ntquery.h>
MDDFilt::MDDFilt()
{
   m_loadFailed = true;
   m_initFailed = true;
   m_assetKeyFound = false;
   m_locale = GetUserDefaultLCID(); // Will be set when we parse the asset key
   m_pLinkedDocumentFilter = NULL;
   m_Text = L"";
   m_numCharsLeft = 0;
   try
   {
      m_pSchemaHandler = new SchemaHandler(L"WDS");
   }
   catch(SchemaHandlerFileNotLoadedException e)
   {
   }
   catch(SchemaHandlerBadFileException e)
   {
   }
}
MDDFilt::~MDDFilt()
{
}
// Index component initialized the filter using this method.
STDMETHODIMP MDDFilt::Init(
   ULONG grfFlags,
   ULONG cAttributes,
   FULLPROPSPEC const * aAttributes,
   ULONG * pFlags
)
```

```
{
    MDDFILT_COM_BEGIN(hr);
    if (m_loadFailed) // Either no Load call or the Load Failed.
    {
        return E_FAIL;
    }
    // Ok. sucessful load of MDD.
    *pFlags = 0;
    m_currentChunkIter = m_properties.begin();
    m_chunkId = 1;
    m_lastEmittedChunkType = ChunkNone;
    m_pendingPropertyChunk = false;
    m_textOnly = false;
    if ((grfFlags & IFILTER_INIT_APPLY_INDEX_ATTRIBUTES) == 0)
    {
        m_textOnly = true;
    }
    if (aAttributes || (!aAttributes && cAttributes != 0)) //ability to index the desired props.
    {
        return E_FAIL;
    }
    if (m_pLinkedDocumentFilter) // Init a Linked Document Filter. (Created during Load)
    {
        ULONG dwFlags;
        HRESULT      hr      =      m_pLinkedDocumentFilter->Init(IFILTER_INIT_INDEXING_ONLY, 0, NULL, &dwFlags);
        if (hr != S_OK) // Just Skip Full Text Indexing.
        {
            m_pLinkedDocumentFilter = NULL;
        }
    }
    m_initFailed = false;
```

```
      return S_OK;
   MDDFILT_COM_END(hr);
}
// return all property chunks. then the Text Chunks.
// If Document if AML or we have embedded FTS data, can return just one chunk
// If there is a non-aml linked doc, we pass on to that for Text.
STDMETHODIMP MDDFilt::GetChunk(STAT_CHUNK * pStat)
{
   MDDFILT_COM_BEGIN(hr);
   if (m_loadFailed || m_initFailed)
   {
      return FILTER_E_END_OF_CHUNKS;
   }
   if (m_chunkId == 1)
   {
      m_currentChunkIter = m_properties.begin();
   }
   else
   {
      if (m_currentChunkIter != m_properties.end())
      {
         m_currentChunkIter++;
      }
   }
   // return Property Chunks first.
   // return Text chunk(s) last.
   if (m_textOnly || m_currentChunkIter == m_properties.end()) // No more Props. text.
   {
      return GetTextChunk(pStat);
   }
   else
   {
      // Assumes m_currentChunkIter is valid.
```

```
      return GetPropertyChunk(pStat);
    }
    MDDFILT_COM_END(hr);
}
//Retrieves the IFilter chunk for current property (m_currentChunkIter). Assume Iterator is valid.
HRESULT MDDFilt::GetPropertyChunk(STAT_CHUNK *pStat)
{
    // Ok. No more. (this condition may_not_ be hit)
    if (m_currentChunkIter == m_properties.end())
    {
        return FILTER_E_END_OF_CHUNKS;
    }
    m_pendingPropertyChunk = true;
    m_lastEmittedChunkType = ChunkValue;
    pStat->idChunk = m_chunkId;
    pStat->breakType = CHUNK_NO_BREAK;
    pStat->flags = CHUNK_VALUE;
    pStat->locale = m_locale;
    pStat->attribute = (m_currentChunkIter->second).GetFullPropSpec();
    pStat->idChunkSource = m_chunkId;
    pStat->cwcStartSource = 0;
    pStat->cwcLenSource = 0;
    m_chunkId++;
    return S_OK;
}
// Get a chunk corresponding to Text.
// get from <contentName> element (chained filter) or <ftsdata> element.
HRESULT MDDFilt::GetTextChunk(STAT_CHUNK *pStat)
{
    if (m_pLinkedDocumentFilter) // Linked Fts data.
    {
        HRESULT hr = S_OK;
        STAT_CHUNK stat;
```

```
hr = m_pLinkedDocumentFilter->GetChunk(&stat);
if (FAILED(hr) || hr != S_OK)
{
   return FILTER_E_END_OF_CHUNKS;
}
// initialized linked doc to return text.
// If it returns a Value, potential bug or a problem in chained IFilter.
if (stat.flags == CHUNK_VALUE)
{
   return FILTER_E_END_OF_CHUNKS;
}
else // Pass it onto caller. Just change the chunk ID.
{
   *pStat = stat;
   pStat->idChunk = m_chunkId;
   pStat->idChunkSource = m_chunkId;
   m_chunkId++;
   m_lastEmittedChunkType = ChunkText;
   return S_OK;
}
}
else // Embedded Text. Either from aml file or <ftsdata> element.
{
   // emit one text chunk in case of embedded ftsdata.
   // Since Text Chunks may be emitted only after Prop Chunks.
   if (m_lastEmittedChunkType == ChunkText)
   {
      return FILTER_E_END_OF_CHUNKS;
   }
   // Our Embedded Text Chunk <ftsdata>
   pStat->idChunk = m_chunkId;
   pStat->breakType = CHUNK_NO_BREAK;
   pStat->flags = CHUNK_TEXT;
   pStat->locale = m_locale;
```

```
            pStat->attribute.guidPropSet = StoragePropSet ;
            pStat->attribute.psProperty.ulKind = PRSPEC_PROPID ;
            pStat->attribute.psProperty.propid = PID_STG_CONTENTS;
            pStat->idChunkSource = m_chunkId;
            pStat->cwcStartSource = 0;
            pStat->cwcLenSource = 0;
            m_chunkId++;
            m_lastEmittedChunkType = ChunkText;
            return S_OK;
        }
        return FILTER_E_END_OF_CHUNKS;
    }
    // Return the Text requested by the index component.
    // preceded by a GetChunk which returned a TEXT chunk.
    STDMETHODIMP   MDDFilt::GetText(ULONG * pcwcBuffer, WCHAR * awcBuffer)
    {
        MDDFILT_COM_BEGIN(hr);
        if (m_loadFailed || m_initFailed)
        {
            return FILTER_E_NO_TEXT;
        }
        if (m_lastEmittedChunkType != ChunkText)
        {
            return FILTER_E_NO_TEXT;
        }
        if (m_pLinkedDocumentFilter) // Linked Text
        {
            return m_pLinkedDocumentFilter->GetText(pcwcBuffer, awcBuffer);
        }
        else // Embedded Text
        {
            HRESULT hr = S_OK;
            if (m_numCharsLeft == 0)
```

```
        {
          return FILTER_E_NO_MORE_TEXT;
        }
        ULONG totalLen = m_Text.Length();
        if (m_numCharsLeft > totalLen) //Weirdness.
        {
          return FILTER_E_NO_MORE_TEXT;
        }
        ULONG offset = totalLen - m_numCharsLeft;
        WCHAR *text = m_Text;
        if (m_numCharsLeft < *pcwcBuffer) //Last of the text block
        {
          errno_t err = wmemcpy_s(awcBuffer, *pcwcBuffer, text+offset, m_numCharsLeft);
          if (err)
          {
            return HRESULT_FROM_WIN32(err);
          }
          *pcwcBuffer = m_numCharsLeft;
          m_numCharsLeft = 0;
          return FILTER_S_LAST_TEXT;
        }
        else
        {
          errno_t err = wmemcpy_s(awcBuffer, *pcwcBuffer, text+offset, *pcwcBuffer);
          m_numCharsLeft -= *pcwcBuffer;
          return HRESULT_FROM_WIN32(err);
        }
      }
      return FILTER_E_NO_MORE_TEXT;
      MDDFILT_COM_END(hr);
    }
    // Return the Property which requested by the index component.
```

```
// preceded by a GetChunk which returned a VALUE chunk.
STDMETHODIMP MDDFilt::GetValue(PROPVARIANT **ppPropValue)
{
  MDDFILT_COM_BEGIN(hr);
  if (m_loadFailed || m_initFailed)
  {
    return FILTER_E_NO_VALUES;
  }
  if (m_lastEmittedChunkType != ChunkValue) // GetChunk not called!
  {
    return FILTER_E_NO_VALUES;
  }
  if (!m_pendingPropertyChunk) //GetValue already called.
  {
    return FILTER_E_NO_MORE_VALUES;
  }
  if (m_currentChunkIter != m_properties.end())
  {
    try
    {
      *ppPropValue = (m_currentChunkIter->second).GetPropVariant();
    }
    catch (MDDFiltOutOfMemoryException e)
    {
      return E_OUTOFMEMORY;
    }
  }
  else //Badness. Chunked more than we can give.
  {
    return FILTER_E_NO_VALUES;
  }
  m_pendingPropertyChunk = false;
  return S_OK;
  MDDFILT_COM_END(hr);
```

}
// Not implemented. IFilter::BindRegion.
STDMETHODIMP MDDFilt::BindRegion(FILTERREGION origPos, const IID &riid, void ** ppunk)
{
  MDDFILT_COM_BEGIN(hr);
  return E_NOTIMPL;
  MDDFILT_COM_END(hr);
}
// for IPersist Interface.
STDMETHODIMP MDDFilt::GetClassID(CLSID * pClassID)
{
  MDDFILT_COM_BEGIN(hr);
  // TODO: Change this!
  CComBSTR ourUniversalID = L"{ACA0BF5C-A5A9-11DA-8A7A-0008744F4E8A}";
  HRESULT hr;
  hr = CLSIDFromString( ourUniversalID, pClassID );
  if( hr == E_FAIL )
  {
    return E_FAIL;
  }
  return S_OK;
  MDDFILT_COM_END(hr);
}
// IPersist::IsDirty
STDMETHODIMP MDDFilt::IsDirty()
{
  MDDFILT_COM_BEGIN(hr);
  return S_FALSE;
  MDDFILT_COM_END(hr);
}
// IPersist::Load.
// One of the ways to load the mdd file.

```
STDMETHODIMP    MDDFilt::Load(LPCWSTR    pszFileName,    DWORD
dwMode)
{
    MDDFILT_COM_BEGIN(hr);
    m_mddFileName = pszFileName;
    m_loadFailed = true;
    m_assetKeyFound = false;
    m_pLinkedDocumentFilter = NULL;
    m_Text = L"";
    m_numCharsLeft = 0;
    try
    {
        ParseFile(m_mddFileName);
    }
    catch(MDDFiltOutOfMemoryException)
    {
        hr = E_OUTOFMEMORY;
    }
    catch(...)
    {
        hr = E_FAIL;
    }
    m_loadFailed = false;
    MDDFILT_COM_END(hr);
}
// Not impl. IPersist::Save
STDMETHODIMP    MDDFilt::Save(LPCWSTR    pszFileName,    BOOL
fRemember)
{
    MDDFILT_COM_BEGIN(hr);
    return E_FAIL;
    MDDFILT_COM_END(hr);
}
// Not impl. IPersist::SaveCompleted
```

```
STDMETHODIMP MDDFilt::SaveCompleted(LPCWSTR pszFileName)
{
  MDDFILT_COM_BEGIN(hr);
  return S_OK;
  MDDFILT_COM_END(hr);
}
// Not Impl. IPersist::GetCurFile.
STDMETHODIMP MDDFilt::GetCurFile(LPWSTR * ppszFileName)
{
  MDDFILT_COM_BEGIN(hr);
  return S_OK;
  MDDFILT_COM_END(hr);
}
// IPersistStream::Load
// Similar to IPersist::Load
// The mdd file as a stream.
STDMETHODIMP MDDFilt::Load(IStream *pstm)
{
  MDDFILT_COM_BEGIN(hr);
  m_mddFileName = L"";
  m_loadFailed = true;
  m_assetKeyFound = false;
  m_pLinkedDocumentFilter = NULL;
  m_Text = L"";
  m_numCharsLeft = 0;
  try
  {
    ParseStream(pstm);
  }
  catch(MDDFiltOutOfMemoryException)
  {
    hr = E_OUTOFMEMORY;
  }
  catch(...)
```

```
{
    hr = E_FAIL;
}
m_loadFailed = false;
MDDFILT_COM_END(hr);
}
// IPersistStream
STDMETHODIMP MDDFilt::Save(IStream *pstrm, BOOL fclearDirty)
{
    MDDFILT_COM_BEGIN(hr);
    return E_NOTIMPL;
    MDDFILT_COM_END(hr);
}
// IPersistStream
STDMETHODIMP MDDFilt::GetSizeMax(ULARGE_INTEGER *pcbSize)
{
    MDDFILT_COM_BEGIN(hr);
    return E_NOTIMPL;
    MDDFILT_COM_END(hr);
}
// Called by IPersistStream::Load.
void MDDFilt::ParseStream(IStream *pStrm)
{
    CComPtr <IStream> pXml = pStrm;
    CComPtr     <IXMLDOMDocument2>     pMddDom     = XmlUtil::CreateXmlDom(pXml);
    if (!pMddDom)
    {
        ApThrow(MDDFiltFileNotLoadedException(L"Could not create XML Dom"));
    }
    // Main Parsing Routine.
    ParseMddDom(pMddDom);
}
```

```
// Called by IPersist::Load.
void MDDFilt::ParseFile(const CString &fileName)
{
    CComPtr <IXMLDOMDocument2> pMddDom = XmlUtil::CreateXmlDomFromUrl(CComBSTR(fileName));
    if (!pMddDom)
    {
        ApThrow(MDDFiltFileNotLoadedException(L"Could not create XML Dom"));
    }
    // Main Parsing Routine.
    ParseMddDom(pMddDom);
}

// Main Parsing Routine.
// Parses the file, fills in the appropriates structures (m_properties, etc.)
void MDDFilt::ParseMddDom(const CComPtr <IXMLDOMDocument2> & pMddDom)
{
    HRESULT hr = S_OK;
    CComPtr <IXMLDOMElement> pAssetAttributes;
    hr = pMddDom->get_documentElement(&pAssetAttributes);
    ApHrCheck(hr, COMException(hr, L"No asset Attributes"));
    // Retrieve Content Type First. Need this in case content is aml and process <contentName>
    // before <contentType>
    CComPtr <IXMLDOMNode> pAssetAttrNode = pAssetAttributes;
    try
    {
        m_contentType = XmlUtil::GetStringValueFromXmlDom(pAssetAttrNode,L"contentType");
    }
    catch(XPathNotFoundException) // contentType is not mandatory. Catch exception and ignore.
```

```
{
}
CComPtr <IXMLDOMNodeList> pChildNodes;
hr = pAssetAttributes->get_childNodes(&pChildNodes);
ApHrCheck(hr, COMException(hr, L"No children of assetAttributes"));
    long numChildren = 0;
hr = pChildNodes->get_length(&numChildren);
ApHrCheck(hr, COMException(hr, L"No Children of assetAttributes"));
for (long i = 0; i < numChildren; i++)
{
    CComPtr <IXMLDOMNode> pChild;
    hr = pChildNodes->nextNode(&pChild);
    ApHrCheck(hr, COMException(hr, L"NextNode Failed"));
    ProcessNode(pChild);
}
if (!m_assetKeyFound) //Asset Key is Mandatory
{
    ApThrow(MDDFiltAssetKeyNotFoundException(L"No Asset Key element"));
}
}
// Process specified sub element of <assetAttribute>
void MDDFilt::ProcessNode(const CComPtr <IXMLDOMNode> &pNode)
{
    CComBSTR name;
    HRESULT hr = S_OK;
    hr = pNode->get_baseName(&name);
    ApHrCheck(hr, COMException(hr, L"Unable to get Element Name"));
    CString nameString = (WCHAR *)name;
    if (nameString.CompareNoCase(L"assetKey") == 0)
    {
        return ProcessAssetKey(pNode);
    }
    if (nameString.CompareNoCase(L"collections") == 0)
```

```
    {
        return ProcessSubElements(pNode, L"Collection");
    }
    if (nameString.CompareNoCase(L"properties") == 0)
    {
        return ProcessProperties(pNode);
    }
    if (nameString.CompareNoCase(L"parents") == 0)
    {
        return ProcessParents(pNode);
    }
    if (nameString.CompareNoCase(L"keywords") == 0)
    {
        return ProcessSubElements(pNode,L"Keywords");
    }
    if (nameString.CompareNoCase(L"contentName") == 0) // companion file.
    {
        return ProcessLinkedFullTextData(pNode);
    }
    if (nameString.CompareNoCase(L"ftsdata") == 0)
    {
        return ProcessEmbeddedFullTextData(pNode);
    }
    if (nameString.CompareNoCase(L"queries") == 0) // Query To Asset Mapping.
    {
        return ProcessSubElements(pNode,L"Queries");
    }
    CComBSTR val;
    hr = pNode->get_text(&val);
    ApHrCheck(hr, MDDFiltException(L"Unable to get text"));
    CString valString = (WCHAR *)val;
    AddProperty(nameString, valString);
}
```

// Adds attribute to m_properties, which is used to return values in GetChunk and

```
void MDDFilt::AddProperty(const CString &nameString, const CString &val)
{
    GUID guid = m_pSchemaHandler->GetDBAttributeGUID(nameString);
    PROPID id = m_pSchemaHandler->GetDBAttributeID(nameString);
    VARTYPE type = m_pSchemaHandler->GetDBAttributeType(nameString);
    pair <CString, CString> attrVal = m_pSchemaHandler->GetDBAttributeValuePair(nameString, val);
    CString valString = attrVal.second;
    pair <GUID, PROPID> propKey;
    propKey.first = guid;
    propKey.second = id;
    propertyIter i = m_properties.find(propKey);
    if (i == m_properties.end()) // New Property
    {
        Property prop(guid,id, type);
        m_properties[propKey] = prop;
        m_properties[propKey].AppendValue(valString);
    }
    else // already seen this one
    {
        if (m_pSchemaHandler->IsMultiValued(nameString))
        {
            (i->second).AppendValue(valString);
        }
    }
}
// Parse Asset Key and AddProperty relevant properties.
// Also add a ToString ("#" separated) representation of AssetKey
void MDDFilt::ProcessAssetKey(const CComPtr <IXMLDOMNode> &pNode)
{
    #define SEP L"#"
    m_assetKeyFound = false;
```

```
            CString           product           =
XmlUtil::GetStringValueFromXmlDom(pNode,L"product");
        if (product.GetLength() == 0)
        {
            throw MDDFiltAssetKeyNotFoundException(L"Missing Product");
        }
        AddProperty(L"Product", product);
        CString assetKey = product;
        assetKey += SEP;
            CString           productRelease         =
XmlUtil::GetStringValueFromXmlDom(pNode,L"productRelease");
        if (productRelease.GetLength() == 0)
        {
            throw MDDFiltAssetKeyNotFoundException(L"Missing Product Release");
        }
        AddProperty(L"ProductRelease", productRelease);
        assetKey += productRelease;
        assetKey += SEP;
        CString culture = XmlUtil::GetStringValueFromXmlDom(pNode,L"culture");
        if (culture.GetLength() == 0)
        {
            throw MDDFiltAssetKeyNotFoundException(L"Missing Culture");
        }
        AddProperty(L"Culture", culture);
        SetLCID(culture);
        assetKey += culture;
        assetKey += SEP;
        CString assetId = XmlUtil::GetStringValueFromXmlDom(pNode,L"assetId");
        if (assetId.GetLength() == 0)
        {
            throw MDDFiltAssetKeyNotFoundException(L"Missing AssetID");
        }
        AddProperty(L"AssetId", assetId);
        assetKey += assetId;
```

```
            assetKey += SEP;
            CString            assetVersion            =
XmlUtil::GetStringValueFromXmlDom(pNode,L"assetVersion");
            if (assetVersion.GetLength() == 0)
            {
                throw MDDFiltAssetKeyNotFoundException(L"Missing Asset Version");
            }
            AddProperty(L"AssetVersion", assetVersion);
            assetKey += assetVersion;
            AddProperty(L"AssetKey", assetKey);
            m_assetKeyFound = true;
        }
        // Process a node which has children.
        // columnName is the column in which each child goes.
        void    MDDFilt::ProcessSubElements(const    CComPtr    <IXMLDOMNode>
&pNode, const CString &columnName)
        {
            HRESULT hr = S_OK;
            CComPtr <IXMLDOMNodeList> pChildNodes;
            hr = pNode->get_childNodes(&pChildNodes);
            ApHrCheck(hr, MDDFiltException(L"ProcessSubElements: No children"));
            if (!pChildNodes)
            {
                return;
            }
            long numChildren = 0;
            hr = pChildNodes->get_length(&numChildren);
            ApHrCheck(hr, COMException(hr, L"ProcessSubElements: No length"));
            for (long i = 0; i < numChildren; i++)
            {
                CComPtr <IXMLDOMNode> pChild;
                CComBSTR value;
                hr = pChildNodes->nextNode(&pChild);
                ApHrCheck(hr, COMException(hr, L"ProcessSubElements: no child"));
```

```cpp
      hr = pChild->get_text(&value);
      ApHrCheck(hr, MDDFiltException(L"ProcessSubElements: no child"));
      AddProperty(columnName,(WCHAR *)value);
   }
}
// Process the <properties> key.
void MDDFilt::ProcessProperties(const CComPtr <IXMLDOMNode> &pNode)
{
   HRESULT hr = S_OK;
   CComPtr <IXMLDOMNodeList> pChildNodes;
   hr = pNode->get_childNodes(&pChildNodes);
   ApHrCheck(hr, MDDFiltException(L"No children of Properties"));
   if (!pChildNodes)
   {
      return;
   }
   long numChildren = 0;
   hr = pChildNodes->get_length(&numChildren);
   ApHrCheck(hr, COMException(hr, L"Properties: No length"));
   for (long i = 0; i < numChildren; i++)
   {
      CComPtr <IXMLDOMNode> pChild;
      CComBSTR value;
      CComBSTR name;
      hr = pChildNodes->nextNode(&pChild);
      ApHrCheck(hr, COMException(hr, L"ProcessProperties: no child"));
      hr = pChild->get_text(&value);
      ApHrCheck(hr, MDDFiltException(L"ProcessProperties: no text"));
      hr = pChild->get_baseName(&name);
      ApHrCheck(hr, MDDFiltException(L"ProcessProperties: no baseName"));
      CComPtr <IXMLDOMNamedNodeMap> pAttributes;
      hr = pChild->get_attributes(&pAttributes);
      ApHrCheck(hr, MDDFiltException(L"ProcessProperties: no attributes"));
      if (!pAttributes)
```

```
          {
            continue;
          }
          CComPtr <IXMLDOMNode> pNamedNode;
          hr = pAttributes->getNamedItem(L"name", &pNamedNode);
          ApHrCheck(hr,   MDDFiltException(L"ProcessProperties:   no   name
attribute"));
          if (!pNamedNode)
          {
            continue;
          }
          hr = pNamedNode->get_text(&name);
          ApHrCheck(hr, MDDFiltException(L"ProcessProperties: name : get_text
failed"));
          AddProperty((WCHAR *)name,(WCHAR *)value);
        }
      }
      // Process the <parents> element.
      void MDDFilt::ProcessParents(const CComPtr <IXMLDOMNode> &pNode)
      {
        HRESULT hr = S_OK;
        CComPtr <IXMLDOMNodeList> pChildNodes;
        hr = pNode->get_childNodes(&pChildNodes);
        ApHrCheck(hr, MDDFiltException(L"No children of Parents"));
        if (!pChildNodes)
        {
          return;
        }
        long numChildren = 0;
        hr = pChildNodes->get_length(&numChildren);
        ApHrCheck(hr, COMException(hr, L"Parents: No length"));
        for (long i = 0; i < numChildren; i++)
        {
          CComPtr <IXMLDOMNode> pChild;
```

```
CComBSTR value;
hr = pChildNodes->nextNode(&pChild);
ApHrCheck(hr, COMException(hr, L"ProcessParents: no child"));
hr = pChild->get_text(&value);
ApHrCheck(hr, MDDFiltException(L"ProcessParents: no text"));
CComPtr <IXMLDOMNamedNodeMap> pAttributes;
hr = pChild->get_attributes(&pAttributes);
ApHrCheck(hr, MDDFiltException(L"ProcessParents: no attributes"));
    if (!pAttributes)
{
   continue;
}
CComPtr <IXMLDOMNode> pOrderNode;
hr = pAttributes->getNamedItem(L"order", &pOrderNode);
ApHrCheck(hr, MDDFiltException(L"ProcessParents: no order attribute"));
if (!pOrderNode)
{
   continue;
}
CComBSTR orderNum;
hr = pOrderNode->get_text(&orderNum);
ApHrCheck(hr, MDDFiltException(L"ProcessParents: order : get_text failed"));
CComPtr <IXMLDOMNode> pPrimaryParentNode;
hr = pAttributes->getNamedItem(L"primaryParent", &pPrimaryParentNode);
ApHrCheck(hr, MDDFiltException(L"ProcessParents: no primary attribute"));

if (!pPrimaryParentNode)
{
   continue;
}
CComBSTR primaryParent;
```

```
            hr = pPrimaryParentNode->get_text(&primaryParent);
            ApHrCheck(hr, MDDFiltException(L"ProcessParents: primaryParent attr :
get_text failed"));
            int primaryParentNum = _wtoi((WCHAR *)primaryParent);
            if (primaryParentNum == 1)
            {
                AddProperty(L"primaryParent", (WCHAR *)value);
            }
            CString orderVal = L"order=";
            orderVal += orderNum;
            orderVal += L"#";
            CString val = orderVal;
            val += value;
            // The value looks like: order=num#AssetKey or order=#AssetKey in case
order is missing.
            AddProperty(L"parents",val);
        }
    }
    // Load up IFilter from the path specified in <contentName>
    // If contentType is aml, we load up the aml file instead. (and treat as embedded)
    void MDDFilt::ProcessLinkedFullTextData(const CComPtr <IXMLDOMNode>
&pNode)
    {
        HRESULT hr = S_OK;
        CComBSTR contentFile;
        hr = pNode->get_text(&contentFile);
        ApHrCheck(hr, COMException(hr, L"contentName: get_text failed"));
        // Index Content Name.
        AddProperty(L"contentName",(WCHAR *)contentFile);
        WCHAR mddDir[MAX_PATH];
        errno_t err = _wsplitpath_s(m_mddFileName, NULL, 0, mddDir,
MAX_PATH, NULL, 0, NULL, 0);
        if (err) // Ignore Text.
        {
```

```
    return;
}
CString contentFileName = mddDir;
contentFileName += contentFile;

if (m_pLinkedDocumentFilter)
{
   m_pLinkedDocumentFilter = NULL;
}
// If aml, load it and get the text.
if (m_contentType.CompareNoCase(L"aml") == 0)
{
  try
  {
     GetTextFromAml(contentFileName);
  }
  catch (COMException e)
  {
     m_Text = L"";
  }
  return;
}
// Not aml. Pick up the appropriate Filter.
hr     =     LoadIFilter(contentFileName,    NULL,    (void **)&m_pLinkedDocumentFilter);
if (FAILED(hr))
{
   m_pLinkedDocumentFilter = NULL;
   return;
}
}
// Populate m_Text using the <ftsdata> element.
// This takes precedence over any linked document.
```

```
void         MDDFilt::ProcessEmbeddedFullTextData(const         CComPtr
<IXMLDOMNode> &pNode)
    {
        HRESULT hr = S_OK;
        if (m_pLinkedDocumentFilter) // <ftsdata> takes precedence over linked doc.
        {
            m_pLinkedDocumentFilter = NULL;
        }
        hr = pNode->get_text(&m_Text);
        ApHrCheck(hr, MDDFiltException(L"ftsdata: get_text failed"));
        m_numCharsLeft = m_Text.Length();
    }
    // Loads up aml File and get the fts data. Populates m_Text.
    void MDDFilt::GetTextFromAml(const CString &amlFile)
    {
        m_amlProcessor.ExtractBody(amlFile, m_Text);
        m_numCharsLeft = m_Text.Length();
    }
    // sets the culture based on the locale name.
    void MDDFilt::SetLCID(const CString &culture)
    {
        m_locale = 1033;
        HMODULE hNlsdll = LoadLibraryW(L"nlsdl.dll");
        if (hNlsdll != NULL)
        {
            pfnDownLevelLocaleNameToLCID         func         =
(pfnDownLevelLocaleNameToLCID)GetProcAddress(hNlsdll,
"DownlevelLocaleNameToLCID");
            if (func != NULL)
            {
                m_locale = func((LPCWSTR)culture, 0);
                FreeLibrary(hNlsdll);
                return;
            }
```

```
        FreeLibrary(hNlsdll);
        hNlsdll = NULL;
    }
    // Look up registry.
    HKEY hLCIDKey = NULL;
    if (RegOpenKeyExW(HKEY_LOCAL_MACHINE,LCID_REGISTRYKEY, 0, KEY_QUERY_VALUE, &hLCIDKey) != ERROR_SUCCESS)
    {
        ApThrow(MDDFiltException(L"Unable to open LCID Registry Key"));
    }
    DWORD lcid;
    DWORD bufferLen = sizeof(lcid);
    DWORD type = 0;
    if (RegQueryValueExW(hLCIDKey, (LPCWSTR)culture, NULL, &type, (LPBYTE)&lcid, &bufferLen) != ERROR_SUCCESS)
    {
        RegCloseKey(hLCIDKey);
        ApThrow(MDDFiltException(L"Unable to query Registry Key to obtain lcid"));
    }
    if (type != REG_DWORD)
    {
        RegCloseKey(hLCIDKey);
        ApThrow(MDDFiltException(L"Invalid type for lcid. Expecting DWORD"));
    }
    RegCloseKey(hLCIDKey);
    m_locale = lcid;
}
```

The metadata handler can include a mddfilt.h module which is the header file that corresponds with the mddfilt.cpp module and includes:

```
#pragma once
//Include .REG Files.
#include "resource.h"
```

```
#include "stdafx.h"
#include <vector>
#include <utility>
#include "mddfiltexceptions.h"
#include "schemaHandler.h"
#include "xmlutil.h"
#include "amlProcessor.h"
#include "property.h"
using namespace std;
// {F7B144F3-F637-4a0a-9CF9-494D3B4C6D99}
static const GUID CLSID_PersistentHandler =
{
    0xf7b144f3,
    0xf637,
    0x4a0a,
    { 0x9c, 0xf9, 0x49, 0x4d, 0x3b, 0x4c, 0x6d, 0x99 }
};
// Prop Guid for Full Text Data.
static const GUID StoragePropSet =
{
    0xb725f130,
    0x47ef,
    0x101a,
    { 0xa5, 0xf1, 0x02, 0x60, 0x8c, 0x9e, 0xeb, 0xac }
};
// false is to not include default idls.
// Refer msdn documentation.
[emitidl(true,false)];
// MDDFilt
[
    coclass,
    threading(both),
    vi_progid("MddFilter"),
    progid("MddFilter.1"),
```

```
version(1.0),
uuid("ACA0BF5C-A5A9-11DA-8A7A-0008744F4E8A"),
helpstring("AP MDDFilter Class")
]
class ATL_NO_VTABLE MDDFilt :
    public IFilter,
    public IPersistFile,
    public IPersistStream
{
public:
    MDDFilt();
    ~MDDFilt();
    // IFilter Methods
    STDMETHOD(Init)(
        ULONG grfFlags,
        ULONG cAttributes,
        FULLPROPSPEC const * aAttributes,
        ULONG * pFlags
    );
    STDMETHOD(GetChunk)(STAT_CHUNK * pStat);
    STDMETHOD(GetText)(ULONG * pcwcBuffer, WCHAR * awcBuffer);
    STDMETHOD(GetValue)(PROPVARIANT **ppPropValue);
    STDMETHOD(BindRegion)(FILTERREGION origPos, const IID &riid, void ** ppunk);
    // IPersistFile Methods.
    STDMETHOD(GetClassID)(CLSID * pClassID);
    STDMETHOD(Load)(LPCWSTR pszFileName, DWORD dwMode);
    STDMETHOD(Save)(LPCWSTR pszFileName, BOOL fRemember);
    STDMETHOD(SaveCompleted)(LPCWSTR pszFileName);
    STDMETHOD(GetCurFile)(LPWSTR *ppszFileName);
    STDMETHOD(IsDirty)();
    // IPersistStream Methods.
    STDMETHOD(Load)(IStream *pStm);
    STDMETHOD(Save)(IStream *pStm, BOOL fClearDirty);
```

```cpp
        STDMETHOD(GetSizeMax)(ULARGE_INTEGER *pcbSize);
private:
        // Private Methods.
        void ParseFile(const CString &fileName); //Parses MDD given Filename.
        void ParseStream(IStream *pStrm); // Parses MDD given stream.
        void ParseMddDom(const CComPtr <IXMLDOMDocument2> &pMddDom);
// Parses loaded MDD DOM.
        void ProcessAssetKey(const CComPtr <IXMLDOMNode> &pNode); // Parse Asset Key.
        void ProcessProperties(const CComPtr <IXMLDOMNode> &pNode); // Parse <properties>
        void ProcessParents(const CComPtr <IXMLDOMNode> &pNode); // Parse <parents>
        void ProcessSubElements(const CComPtr <IXMLDOMNode> &pNode, const CString &columnName);
        void ProcessLinkedFullTextData(const CComPtr <IXMLDOMNode> &pNode); // <contentName>
        void ProcessEmbeddedFullTextData(const CComPtr <IXMLDOMNode> &pNode); // <ftsdata>
        void ProcessNode(const CComPtr <IXMLDOMNode> &pNode);
        void AddProperty(const CString &column, const CString &val); // sets up m_properties ifilter methods
        typedef LCID (*pfnDownLevelLocaleNameToLCID)(LPCWSTR, DWORD);
        #define                LCID_REGISTRYKEY L"Software\\Microsoft\\AssistancePlatform\\2.0\\Client\\LCID"
        void SetLCID(const CString &culture); // m_locale = ?
        void GetTextFromAml(const CString &amlFile); // get fts data from aml file.
        HRESULT GetPropertyChunk(STAT_CHUNK *pStat); // Internal GetChunk helpers.
        HRESULT GetTextChunk(STAT_CHUNK *pStat);
        / Helper Classes.
        // Comparator for map.
        class GuidPropIdComparator : public std::binary_function <
                pair <GUID,PROPID>, pair <GUID, PROPID>,
```

```cpp
                            bool>
{
public:
    bool operator() (pair <GUID,PROPID> l, pair <GUID, PROPID> r) const
    {
        if (l.second != r.second) //Compare PropID first.
        {
            return l.second < r.second;
        }
        else //Compare GUID now.
        {
            GUID left = l.first;
            GUID right = r.first;
            return (memcmp(&left,&right,sizeof(GUID)) < 0);
        }
    }
};
typedef    map    <pair    <GUID,    PROPID>,    Property,
GuidPropIdComparator>::iterator propertyIter;
    enum ChunkType {ChunkNone, ChunkValue, ChunkText};
    // Private Members.
    // The main map, which contains all the <name, value> pairs for the given
asset.
    map    <pair    <GUID,    PROPID>,    Property,    GuidPropIdComparator>
m_properties;
    bool m_loadFailed; // Were we able to load the MDD file?
    bool m_initFailed; // Did IFilter::Init fail?
    bool m_assetKeyFound; // Did we find an assetKey element?
    LCID m_locale; // content language. Got from assetKey.
    bool m_textOnly; // Index component wants return only Text.
    CComBSTR m_Text; // The actual text
    ULONG m_numCharsLeft; // number of characters remaining to be filtered.
(GetTexTed)
    ULONG m_chunkId; // Current Chunk ID: 1 implies no chunks returned yet.
```

ChunkType m_lastEmittedChunkType; // Prop or Text of the Chunk just GetChunked.

propertyIter m_currentChunkIter; // The pointer to prop being GetChunked and GetValued.

bool m_pendingPropertyChunk; // If a GetChunk has been called, but no GetValue yet.

CString m_mddFileName; // Path to mdd file.

CString m_contentType; // Type of Content, AML, TOC, etc.

CSmartPtr <SchemaHandler> m_pSchemaHandler; // Schema Handler. Handles the (column,value) mapping.

CComPtr <IFilter> m_pLinkedDocumentFilter; // If <contentName>, corresponding filter.

amlProcessor m_amlProcessor; // Processor From linked aml.

};

The metadata handler can include an mddfilterexceptions.h module which provides an auxiliary support file describing all the "exceptions" thrown from the metadata handler, such as from a metadata IFilter for example. The mddfilterexceptions.h module includes:

```
/*
* MDDFiltExceptions.h : Internal Exceptions of MDD Filter.
*/
#pragma once
#include "exceptions.h"
namespace APClient
{
    class MDDFiltException : public ApException
    {
    public:
        MDDFiltException(const CComBSTR& message = L"") : ApException(message) { }
        virtual ~MDDFiltException() {}
        DECLARE_APEXCEPTION();
    };
    class MDDFiltFileNotLoadedException : public ApException
```

```
        {
        public:
            MDDFiltFileNotLoadedException(const CComBSTR& message = L"") :
ApException(message) { }
            virtual ~MDDFiltFileNotLoadedException() {}
            DECLARE_APEXCEPTION();
        };
        class MDDFiltOutOfMemoryException : public ApException
        {
        public:
            MDDFiltOutOfMemoryException(const CComBSTR& message = L"") :
ApException(message) { }
            virtual ~MDDFiltOutOfMemoryException() {}
            DECLARE_APEXCEPTION();
        };
        class MDDFiltAssetKeyNotFoundException : public ApException
        {
        public:
            MDDFiltAssetKeyNotFoundException(const CComBSTR& message = L"")
: ApException(message) { }
            virtual ~MDDFiltAssetKeyNotFoundException() {}
            DECLARE_APEXCEPTION();
        };
        }
```

The metadata handler can include a property.h module which represents a class used by the metadata handler to represent a "property". The property can be used to describe metadata (name, type, value, etc.). The property.h module includes:

```
#pragma once
#include "stdafx.h"
#include "strsafe.h"
#include "propidl.h"
// Representation (FULLPROPSPEC and corresponding PROPVARIANT). Used
for GetChunk and GetValue.
class Property
```

```cpp
{
public:
    Property() {};
    Property(GUID guid, PROPID pId, VARTYPE type):
    m_guid(guid),m_propId(pId), m_type(type)
    {
    }
    ~Property() {};
    // Add value to array. Useful in case of multi-valued columns.
    void AppendValue(const CString &val)
    {
        m_values.push_back(val);
    }
    PROPVARIANT *GetPropVariant()
    {
        // handling VT_LPWSTR and VT_VECTOR|VT_LPWSTR
        PROPVARIANT    *pPV    =    (PROPVARIANT *)CoTaskMemAlloc(sizeof(PROPVARIANT));
        if (!pPV)
        {
            ApThrow(MDDFiltOutOfMemoryException(L"Cannot create propVariant"));
        }
        PropVariantInit(pPV);
        pPV->vt = m_type;
        size_t numString = m_values.size();
        if (numString == 0) // Should not be hit.
        {
            CoTaskMemFree(pPV);
            pPV = NULL;
            return pPV;
        }
        size_t i = 0;
        LPWSTR * ppVal = NULL;
```

```
HRESULT hr = S_OK;
switch (m_type & (~VT_LPWSTR))
{
   case VT_VECTOR:
      ppVal = (WCHAR **)CoTaskMemAlloc(numString*sizeof(WCHAR *));

if (!ppVal)
      {
         CoTaskMemFree(pPV);
         pPV = NULL;
         ApThrow(MDDFiltOutOfMemoryException(L"Cannot create propString"));
      }
      for (i = 0; i < numString ; i ++)
      {
         size_t len = m_values[i].GetLength()+1;
         WCHAR *pVal = (LPWSTR)CoTaskMemAlloc(len*sizeof(WCHAR));
         if (!pVal)
         {
            break;
         }
         hr = StringCchCopyW(pVal, len, m_values[i]);
         if (FAILED(hr))
         {
            CoTaskMemFree(pVal);
            break;
         }
         ppVal[i] = pVal;
      }
      if (i < numString) // Memory allocation failed.
      {
         for (size_t j = 0; j < i; j++)
         {
```

```
                CoTaskMemFree(ppVal[j]);
            }
            CoTaskMemFree(ppVal);
            CoTaskMemFree(pPV);
            pPV = NULL;
            ApThrow(MDDFiltOutOfMemoryException(L"Cannot create propString"));
        }
        pPV->calpwstr.cElems = numString;
        pPV->calpwstr.pElems = ppVal;
        break;
    default:
        size_t len = m_values[0].GetLength()+1;
        WCHAR *pVal = (LPWSTR)CoTaskMemAlloc(len*sizeof(WCHAR));
        if (!pVal)
        {
            CoTaskMemFree(pPV);
            pPV = NULL;
            ApThrow(MDDFiltOutOfMemoryException(L"Cannot create propString"));
        }
        hr = StringCchCopyW(pVal, len, m_values[0]);
        if (FAILED(hr))
        {
            CoTaskMemFree(pVal);
            CoTaskMemFree(pPV);
            pPV = NULL;
            ApThrow(MDDFiltOutOfMemoryException(L"String Copy Failed"));
        }
        pPV->pwszVal = pVal;
    }
    return pPV;
```

```
    }
    FULLPROPSPEC GetFullPropSpec()
    {
        FULLPROPSPEC propSpec;
        propSpec.guidPropSet = m_guid;
        propSpec.psProperty.ulKind = PRSPEC_PROPID;
        propSpec.psProperty.propid = m_propId;
        return propSpec;
    }
private:
    GUID m_guid;
    PROPID m_propId;
    VARTYPE m_type;
    vector <CString> m_values;
};
```

The metadata handler can include a resource.h module which corresponds with an auto-generated resource file and includes:

```
//{{NO_DEPENDENCIES}}
// Used by mddfilt.rc
#pragma once
#define IDS_PROJNAME            100
#define IDR_MDDFILT 101
// Next default values for new objects
//
#ifdef APSTUDIO_INVOKED
#ifndef APSTUDIO_READONLY_SYMBOLS
#define _APS_NEXT_RESOURCE_VALUE    201
#define _APS_NEXT_COMMAND_VALUE     32768
#define _APS_NEXT_CONTROL_VALUE     201
#define _APS_NEXT_SYMED_VALUE       102
#endif
#endif
```

The metadata handler can include a Stdafx.cpp module which corresponds with an auto-generated file used for pre-compiling standard headers and includes:

// stdafx.cpp : source file

// APMetaDataFilter.pch the pre-compiled header

// stdafx.obj will contain the pre-compiled type information include "stdafx.h"

The metadata handler can include a stdafx.h module which corresponds with an auto-generated standard header file used to declare all headers that would be precompiled.

/* stdafx.h : include file for standard system include files, or project specific include files that are used frequently, but are changed infrequently */ pragma once ifndef STRICT define STRICT endif

// Modify the following referring to target a platform prior to the ones specified below.

ifndef WINVER define WINVER 0x0501    // Change this to the appropriate value to target other operating system versions.

endif ifndef _WIN32_WINNT define _WIN32_WINNT 0x0501    // Change this to the appropriate value to target other operating system versions.

endif ifndef _WIN32_WINDOWS define _WIN32_WINDOWS 0x0410 endif ifndef _WIN32_IE define _WIN32_IE 0x0600 endif define _ATL_APARTMENT_THREADED define _ATL_NO_AUTOMATIC_NAMESPACE define _ATL_CSTRING_EXPLICIT_CONSTRUCTORS    // some CString constructors are explicit include <atlbase.h> include <atlcom.h>

Various embodiments described herein can be included with the functionality of an assistance platform rich client. Users can execute searches using the assistance platform rich client which can operate to issue a search for MDD files to a desktop search engine. The MDD files can be interacted with, due in part to the XML file format, to ascertain an actual location and name of a particular file that is represented in part by metadata. The desktop search can operate to return the content, link, or other user-friendly information to the user based on an introspection of the MDD file.

The embodiments and examples described herein are not intended to be limiting and other embodiments are available. For example, the functionality described herein can be used as part of an xcopy based installation through self-describing content. Content can be installed that have relationships to other installed content, by describing the relationships through metadata. This enables simple xcopy-based installation without the need to modify registry or create custom files that encapsulate the relationships.

As another example, the functionality described herein can be used to provide a uniform representation of metadata across different media formats (wma, mp3, jpeg, png, etc.). Metadata files can be used to provide a uniform representation for all metadata for various media formats. Since the format is flexible and extensible, any metadata can be captured in the MDD file. For example, the uniform representation can be used when a media player needs to process metadata from a WMA file, an mp3 file, a wav file or other formats. Instead of learning the format for each file-type (current and future formats), a reliance can be placed on the MDD file for a uniform representation of any associated metadata.

As further example, the functionality described herein can be used to provide an instant shortcut mechanism to create "shortcuts" or "hot words". A shortcut is a word or phrase, which, when typed or otherwise communicated, launches an application or performs some other task. For instance, typing "notepad" in a search box can operate to launch a notepad application. Since the metadata handler functionality is not restricted to file-based content, a "shortcut" can be represented using an MDD file. In such a case, the title would be the name of the shortcut, the "content type" in the MDD file would be "shortcut", and the associated content name would be the path to the application to be launched along with any parameters. A user is able define a shortcut for any application by creating such an MDD file. The shortcut can then be indexed as described above using a metadata handler. When a user types "notepad" in the "start search" box, the operating system (OS) can perform a lookup to determine if there is anything indexed with title "notepad" and content type "shortcut". If it finds one, the OS can launch the associated application pointed to by content name.

The functionality described herein can be applied to associate different sets of metadata for the same content targeting different applications. The functionality can also be applied to newly created or foreign file formats. The functionality allows users to provide tailored metadata for various files as part of a uniform metadata representation. Moreover, the functionality can be used to associate metadata with non-file-based content, such as a virtual content, etc., and allows for searching over file-based, virtual, and other content simultaneously and seamlessly. That is, as described above, an abstraction layer for metadata is provided for access that can be configured to be independent of content-type. The functionality described herein can be used to operate with binary formats, such as image files, etc. For example, a user may be writing a blog or some kind of a description about a particular innovation picture captured as an image file. Accordingly, an MDD file can be used to associate the blog and image file.

The systems and components described above can be implemented as part of networked, distributed, or other computer-implemented environment. The systems and components can communicate via a wired, wireless, and/or a combination of communication networks. In an alternative embodiment, the handler 104 can be included with the index component 102 as a single component for providing functionality for indexing and searching for information associated with a number of files or other data representations. In another embodiment, the handler 104 can be included as part of the functionality of an OS. A system can also include a number of handler components, wherein each handler component can include particular functionality associated with one or more file types. For example, a handler, such as a document IFilter, can be configured to read metadata, content, and/or other information associated with a document file.

A number of client computing devices, including desktop computers, laptops, handhelds, or other smart devices can interact with and/or be included as part of the system 100. In alternative embodiments, the various components can be combined and/or configured according to a desired implementation. Other embodiments and configurations are available.

Exemplary Operating Environment

Figure 7:
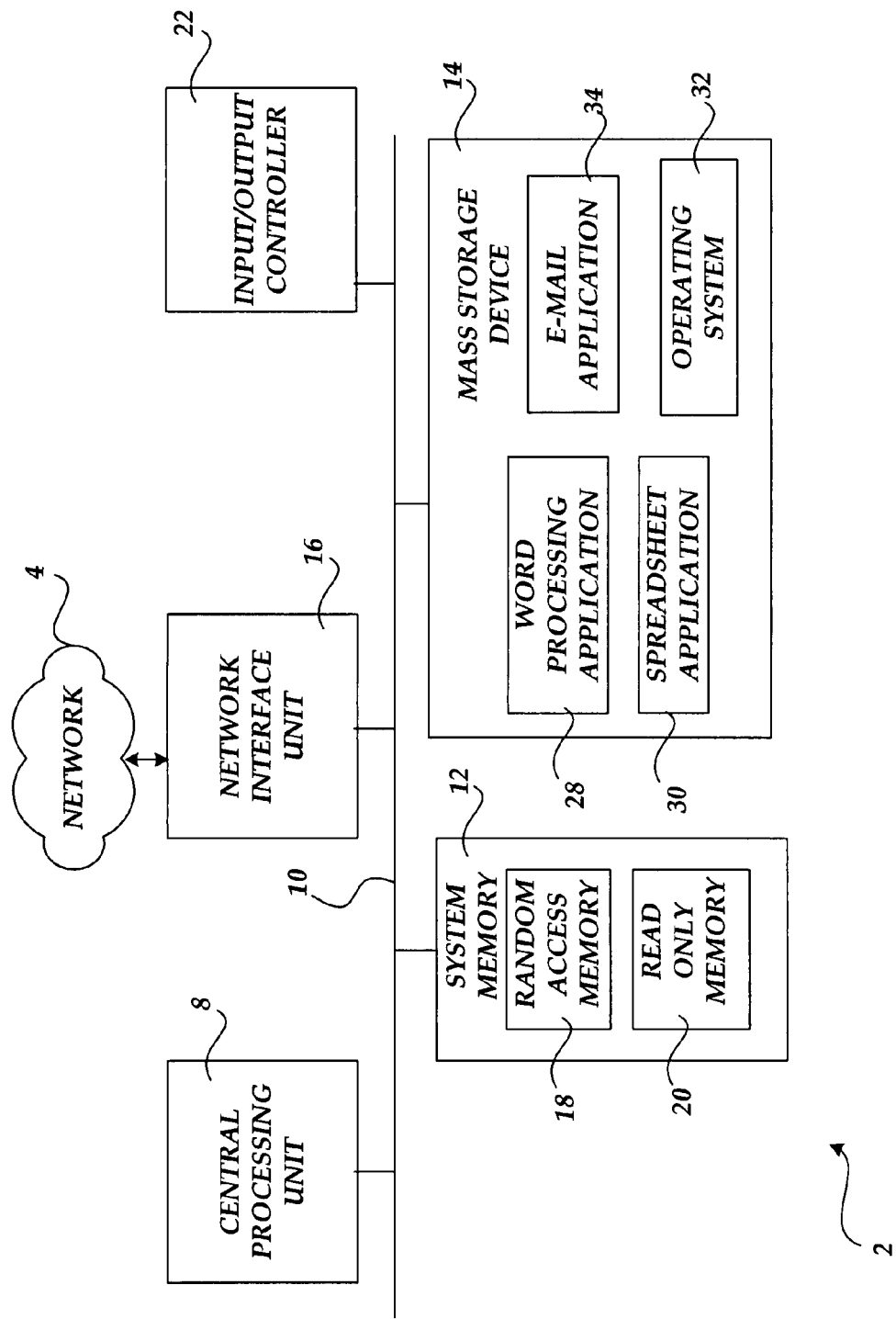
FIG. 7 is a block diagram illustrating a computing environment for implementation of various embodiments described herein.

Referring now to FIG. 7, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 7, an illustrative operating environment for embodiments of the invention will be described. As shown in FIG. 7, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a word processing application 28, a spreadsheet application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer readable medium including executable instructions which, when executed, manage information by:
   creating a plurality of information sources, each information source comprising a metadata definition document (MDD) having a uniform representation of metadata and including full-text search data (FTSData), wherein each information source can be linked to an underlying information source having a representative file format and used to provide additional content for use in searching and indexing operations;
   using a schema to define the MDD for each information source, the schema including a FTSData element to specify FTSData, asset and content elements to identify a linked underlying information source, and a queries element to identify query to underlying information source mappings;
   calling an intermediate handler to extract metadata and FTSData from the plurality of information sources, the intermediate handler to return the metadata and FTSData from each information source based in part on operating modes including:
      a first operating mode to append FTSData of each information source with FTSData of a corresponding linked underlying information source and provide a union of metadata from each information source and the corresponding linked underlying information source, including ignoring the metadata of linked underlying information sources for conflicts of first metadata types;
      a second operating mode to append FTSData of each information source with FTSData of the corresponding linked underlying information source and provide a union of metadata from each information source and the corresponding linked underlying information source, including ignoring the metadata of the information sources for conflicts of the first metadata types;
      a third operating mode to return FTSData of each information source and provide a union of metadata from each information source and the corresponding linked underlying information source, including ignoring the metadata of the linked underlying information sources for conflicts of the first metadata types and second metadata types; and,
      a fourth operating mode to return FTSData of each linked underlying information source and provide a union of metadata from each information source and the corresponding linked underlying information source, including ignoring the metadata of the information sources for conflicts of the first metadata types and the second metadata types;
   invoking a registered handler to extract metadata and other information from each linked underlying information source; and,
   using the metadata and FTSData as part of the indexing and searching operations.

2. The computer-readable medium of claim 1, wherein the instructions, when executed, manage information by searching against the FTSData as part of a full-text search.

3. The computer-readable medium of claim 1, wherein the instructions, when executed, manage information by defining MDD file that includes the metadata and FTSData to be associated with each linked underlying information source.

4. The computer-readable medium of claim 1, wherein the instructions, when executed, manage information by defining a MDD file that is associated with a new type of underlying information source.

5. The computer-readable medium of claim 1, wherein the instructions, when executed, manage information by chaining a plurality of handlers to create a chain of handlers, wherein the chain of handlers operate to extract metadata and FTSData from a plurality of MDD files and underlying information sources.

6. The computer-readable medium of claim 5, wherein the instructions, when executed, manage information by chaining a plurality of IFilters to create a chain of IFilters, wherein the chain of IFilters can operate to extract the metadata and the FTSData.

7. The computer-readable medium of claim 1, wherein the instructions, when executed, manage information by extracting the metadata and FTSData from each information source and the corresponding linked underlying information source according to a defined mode of operation.

8. The computer-readable medium of claim 7, wherein the instructions, when executed, manage information by using a setting to define the mode of operation before extracting the metadata and FTSData.

9. The computer-readable medium of claim 7, wherein the instructions, when executed, manage information by returning the metadata and FTSData from each information source and the corresponding linked underlying information source according to an append with MDD priority mode of operation.

10. The computer-readable medium of claim 7, wherein the instructions, when executed, manage information by returning the metadata and FTSData from each information source and the corresponding linked underlying information source according to an append with content priority mode of operation.

11. The computer-readable medium of claim 7, wherein the instructions, when executed, manage information by returning the metadata and FTSData from each information source and the corresponding linked underlying information source according to an overwrite with MDD priority mode of operation.

12. The computer-readable medium of claim 7, wherein the instructions, when executed, manage information by returning the metadata and FTSData from each information source and the corresponding linked underlying information source according to an overwrite with content priority mode of operation.

13. The computer-readable medium of claim 7, wherein the instructions, when executed, manage information by returning the metadata and FTSData from each information source and the corresponding linked underlying information source according to a chain for FTSData only mode of operation.

14. The computer-readable medium of claim 7, wherein the instructions, when executed, manage information by returning the metadata and FTSData from each information source and the corresponding linked underlying information source according to a fine-granularity mode of operation.

15. A system to manage information comprising:
a plurality of information sources, each information source comprising a MDD that includes a uniform representation of metadata and being defined using a schema that includes a FTSData element to specify FTSData, asset and content elements to identify a linked underlying information source, and a queries element to identify query to underlying information source mappings, wherein the plurality of information sources include FTSData and are linked to underlying information sources;
an intermediate handler configured to filter metadata from the plurality of information sources and return the metadata and FTSData from each information source based in part on operating modes that include:
  a first operating mode to append FTSData of each information source with FTSData of a corresponding linked underlying information source and provide a union of metadata from each information source and the corresponding linked underlying information source, wherein the intermediate handler operates as part of the first operating mode to ignore the metadata of linked underlying information sources for conflicts of first metadata types;
  a second operating mode to append FTSData of each information source with FTSData of the corresponding linked underlying information source and provide a union of metadata from each information source and the corresponding linked underlying information source, wherein the intermediate handler operates as part of the second operating mode to ignore the metadata of the information sources for conflicts of the first metadata types;
  a third operating mode to return FTSData of each information source and provide a union of metadata from each information source and the corresponding linked underlying information source, wherein the intermediate handler operates as part of the third operating mode to ignore metadata of the linked underlying information sources for conflicts of the first metadata types and second metadata types; and,
  a fourth operating mode to return FTSData of each linked underlying information source and provide a union of metadata from each information source and the corresponding linked underlying information source, wherein the intermediate handler operates to ignore metadata of the information sources for conflicts of the first metadata types and the second metadata types;
a chained handler configured to filter metadata from the underlying information source, wherein the intermediate handler can call on the chained handler to filter the metadata; and,
an indexer to index the extracted metadata and any existing FTSData against the information source.

16. The system of claim 15, wherein the intermediate handler is further configured to filter FTSData from a MDD file.

17. The system of claim 15, wherein system can be configured to return metadata and FTSData based in part of a mode of operation setting.

18. A method of managing information comprising:
defining a data structure including a uniform representation of metadata, wherein the data structure can include an element defining free-form text that can be used to provide additional details about the data structure;
creating a plurality of information sources based in part on the data structure, each information source comprising a MDD having the uniform representation of metadata and including full-text search data (FTSData), wherein the each information source can be linked to an underlying information source having a representative file format;
extracting the metadata and free-form text from each information source by invoking a metadata handler to extract the metadata and free-form text, the metadata handler to return the metadata and FTSData from each information source based in part on operating modes that include:

a first operating mode to append FTSData of each information source with FTSData of a corresponding linked underlying information source and provide a union of metadata from each information source and the corresponding linked underlying information source, wherein the metadata handler operates as part of the first operating mode to ignore the metadata of linked underlying information sources for conflicts of first metadata types;

a second operating mode to append FTSData of each information source with FTSData of the corresponding linked underlying information source and provide a union of metadata from each information source and the corresponding linked underlying information source, wherein the metadata handler operates as part of the second operating mode to ignore the metadata of the information sources for conflicts of the first metadata types;

a third operating mode to return FTSData of each information source and provide a union of metadata from each information source and the corresponding linked underlying information source, wherein the metadata handler operates as part of the third operating mode to ignore metadata of the linked underlying information sources for conflicts of the first metadata types and second metadata types; and, a fourth operating mode to return FTSData of each linked underlying information source and provide a union of metadata from each information source and the corresponding linked underlying information source, wherein the metadata handler operates as part of the fourth operating mode to ignore metadata of the information sources for conflicts of the first metadata types and the second metadata types;

chaining a second handler that is configured to extract underlying metadata from a corresponding linked underlying information source; and, performing an indexing operation by using the extracted metadata and free-form text to index against the data structure.

19. The method of claim 18, further comprising returning a search result associated with the data structure using the extracted metadata and free-form text as defined by the element.

20. The method of claim 18, further comprising setting a mode of operation and returning metadata and free-form text to an index component based in part on the mode of operation.

* * * * *

UNITED STATES PATENT AND TRADEMARK OFFICE
CERTIFICATE OF CORRECTION

| | | |
|---|---|---|
| PATENT NO. | : 7,725,454 B2 | |
| APPLICATION NO. | : 11/880281 | |
| DATED | : May 25, 2010 | |
| INVENTOR(S) | : Prashant Kamani et al. | |

It is certified that error appears in the above-identified patent and that said Letters Patent is hereby corrected as shown below:

In column 103, line 1, in Claim 3, before "MDD file" insert -- a --.

In column 103, line 10, in Claim 5, after "extract" insert -- the --.

Signed and Sealed this
Seventeenth Day of May, 2011

David J. Kappos
*Director of the United States Patent and Trademark Office*